US011032437B2

(12) United States Patent
Sahagun

(10) Patent No.: US 11,032,437 B2
(45) Date of Patent: Jun. 8, 2021

(54) METHOD TO CREATE A SECURE DISTRIBUTED DATA VALIDATION SYSTEM USING A DISTRIBUTED STORAGE SYSTEM AND ARTIFICIAL INTELLIGENCE

(71) Applicant: KYOCERA DOCUMENT SOLUTIONS INC., Osaka (JP)

(72) Inventor: Allan Sahagun, Oakland, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/716,017

(22) Filed: Dec. 16, 2019

(65) Prior Publication Data
US 2020/0120221 A1    Apr. 16, 2020

Related U.S. Application Data

(63) Continuation of application No. 16/003,081, filed on Jun. 7, 2018, now Pat. No. 10,511,730.

(51) Int. Cl.
*H04N 1/00* (2006.01)
*H04L 29/08* (2006.01)
*G06K 9/00* (2006.01)

(52) U.S. Cl.
CPC ..... *H04N 1/00241* (2013.01); *G06K 9/00449* (2013.01); *H04L 67/1097* (2013.01); *H04N 1/00411* (2013.01); *G06K 2209/27* (2013.01)

(58) Field of Classification Search
CPC ........... H04N 1/00241; H04N 1/00411; G06K 9/00449; G06K 2209/27; G06K 9/00469; G06K 2209/01; G06K 9/00288; G06K 9/00456; G06K 9/00442; G06K 9/033; H04L 67/1097
See application file for complete search history.

(56) References Cited

U.S. PATENT DOCUMENTS

| | | | | |
|---|---|---|---|---|
| 7,152,047 | B1 ‡ | 12/2006 | Nagel | G06K 19/086 |
| | | | | 705/76 |
| 7,577,689 | B1 ‡ | 8/2009 | Masinter | G06F 11/1464 |
| 7,766,241 | B2 ‡ | 8/2010 | Tomita | H04K 1/00 |
| | | | | 235/46 |
| 7,937,588 | B2 ‡ | 5/2011 | Picard | G06T 1/0042 |
| | | | | 713/17 |
| 2007/0022296 | A1 ‡ | 1/2007 | Caverly | H04L 9/3297 |
| | | | | 713/17 |

(Continued)

*Primary Examiner* — Iriana Cruz
(74) *Attorney, Agent, or Firm* — GrowIP Law Group LLC

(57) ABSTRACT

Methods and apparatus for validating paper forms are provided. A node can receive paper-form data from a paper form that has first and second data items (DIs). The node can: determine first and second metadata for the first and second DIs respectively, determine respective first and second validation entities (VEs) to validate respective values of the first and second DIs based on the respective first and second metadata, where the first and second VEs can differ, provide a user interface (UI) including a display of the first DI, receive a validation status for the first DI via the first UI from the first VE, select a first distributed storage system (DSS) associated with the first DI, and record the value of the first DI and the validation status in the first DSS. The node can generate an output related to the paper-form data based on the first DSS.

14 Claims, 13 Drawing Sheets

(56) References Cited

U.S. PATENT DOCUMENTS

| | | | |
|---|---|---|---|
| 2008/0288532 A1 ‡ | 11/2008 | Aboukrat | G06F 21/6209 |
| 2013/0254163 A1 ‡ | 9/2013 | Savage | G06F 16/13 |
| | | | 707/61 |
| 2013/0318426 A1 ‡ | 11/2013 | Shu | G06F 17/243 |
| | | | 715/226 |
| 2016/0269586 A1 * | 9/2016 | Nanaumi | H04N 1/00376 |
| 2018/0268211 A1 * | 9/2018 | Baltsan | G06F 40/174 |

* cited by examiner
‡ imported from a related application

FIG. 9

User Interface 1200

1210 Paper Form Display  1212 Exit Display

EMPLOYMENT APPLICATION FORM

Data Indicator 1230  Validation Indicator (VI)
 ─1220

Biographical Information
First Name: J. <V>    Last Name: Doe <V>    Date: 3/13/2018
Sex: M F    SSN: 123-45-6789 <V>    VI 1222
Address:    123 Any St.    Phone: (312) 555-1212 <V>
  Anytown, USA.    Emergency Contact Name: K. Doe <V>
  12345    Emergency Contact Phone: (312) 555-1313 <V>
        Data Indicator 1232
Are you legally eligible for employment in this country? Y N Data Indicator 1234

Requested Position
Applied-for Position: xxxx cashier    Salary/Wage Required: $15 / hour
Job Requisition Number:  12349    Referral (if any): N/A
Earliest Start Date: 3/20/18

Previous/Current Work Experience (in chronological order):

Data Indicator 1236

1.  Employer: 9d Job 1    Position: cashier
    Dates of Employment 3/17 (month/year) to current (month/year)
    Last Supervisor's Name and Title  J. Buck / floor manager
    Reason for Leaving:  still there    Can we contact this employer? Y N

Data Indicator 1238

2.  Employer: Jobarama    Position: cashier
    Dates of Employment 2/16 (month/year) to 3/17 (month/year)
    Last Supervisor's Name and Title  Li Fawn / asst. manage
    Reason for Leaving:  moved    Can we contact this employer? Y N Data Indicator 1240

3.  Employer: _____    Position: _____
    Dates of Employment ____ (month/year) to ____ (month/year)
    Last Supervisor's Name and Title _____
    Reason for Leaving: _____    Can we contact this employer? Y N 1214 More data from this form...   1216 Side-by-side   1218 New form...

1310 Receive at a node, paper-form data obtained from a paper form, the paper form including a plurality of data items

1320 For at least a first data item and a second data item of the plurality of data items, the node:
- Determine first item metadata for the first data item and second item metadata for the second data item
- Determine a first validation entity to validate a value of the first data item based on the first item metadata
- Determine a second validation entity to validate a value of the second data item based on the second item metadata, where the second validation entity differs from the first validation entity,
- Provide a first user interface including a display of the first data item,
- Receive, from the first validation entity, a first input for a first validation status of the value of the first data item by way of the first user interface,
- Select a first distributed storage system of a plurality of distributed storage systems, where the first distributed storage system is associated with the first data item, and
- Record the value of the first data item and the first validation status of the value of the first data item in the first distributed storage system

1330 Generating an output of the node related to the paper-form data based on the first distributed storage system

FIG. 13

METHOD TO CREATE A SECURE DISTRIBUTED DATA VALIDATION SYSTEM USING A DISTRIBUTED STORAGE SYSTEM AND ARTIFICIAL INTELLIGENCE

CROSS REFERENCE TO RELATED APPLICATIONS

The present application is a continuation of U.S. patent application Ser. No. 16/003,081 filed Jun. 7, 2018, which is herewith incorporated by reference into the present application.

BACKGROUND

Printing devices have increased in number and geographic footprint throughout the world and have become increasingly connected to networks. These networks can include a print server. Typically, when one or more documents and/or other print data are scheduled to be printed, the print data is either directly sent to one printing device, or sent to a print server. In some cases, printing devices include scanning components for creating electronic copies of original paper documents. Such printing devices can be used to scan in paper documents and perhaps transmit corresponding electronic copies.

The networks can include many printing devices. Some or all of the printing devices can have different features, functions, and capabilities. Some or all of the printing devices can generate log files to record operations performed using the printing devices, such as printing operations, scanning operations, and document communication operations.

SUMMARY

In one aspect, a method is provided. A node receives paper-form data obtained from a paper form. The paper form includes a plurality of data items. For at least a first data item and a second data item of the plurality of data items, the node determines first item metadata for the first data item and second item metadata for the second data item; determines a first validation entity to validate a value of the first data item based on the first item metadata; determines a second validation entity to validate a value of the second data item based on the second item metadata, where the second validation entity differs from the first validation entity; provides a first user interface including a display of the first data item; receives, from the first validation entity, a first input for a first validation status of the value of the first data item by way of the first user interface; selects a first distributed storage system of a plurality of distributed storage systems, where the first distributed storage system is associated with the first data item, and records the value of the first data item and the first validation status of the value of the first data item in the first distributed storage system. The node generates an output of the node related to the paper-form data based on the first distributed storage system.

In another aspect, a node is provided. The node includes one or more processors and data storage. The data storage is configured to store computer-readable instructions that, when executed by the one or more processors, cause the node to perform tasks. The tasks include: receiving paper-form data obtained from a paper form, the paper form including a plurality of data items; for at least a first data item and a second data item of the plurality of data items: determining first item metadata for the first data item and second item metadata for the second data item, determining a first validation entity to validate a value of the first data item based on the first item metadata, determining a second validation entity to validate a value of the second data item based on the second item metadata, where the second validation entity differs from the first validation entity, providing a first user interface including a display of the first data item, receiving, from the first validation entity, a first input for a first validation status of the value of the first data item by way of the first user interface, selecting a first distributed storage system of a plurality of distributed storage systems, where the first distributed storage system is associated with the first data item, and recording the value of the first data item and the first validation status of the value of the first data item in the first distributed storage system; and generating an output related to the paper-form data based on the first distributed storage system.

In another aspect, an article of manufacture is provided. The article of manufacture includes non-transitory data storage storing at least computer-readable instructions that, when executed by one or more processors of a node, cause the node to perform tasks. The tasks include: receiving paper-form data obtained from a paper form, the paper form including a plurality of data items; for at least a first data item and a second data item of the plurality of data items: determining first item metadata for the first data item and second item metadata for the second data item, determining a first validation entity to validate a value of the first data item based on the first item metadata, determining a second validation entity to validate a value of the second data item based on the second item metadata, where the second validation entity differs from the first validation entity, providing a first user interface including a display of the first data item, receiving, from the first validation entity, a first input for a first validation status of the value of the first data item by way of the first user interface, selecting a first distributed storage system of a plurality of distributed storage systems, where the first distributed storage system is associated with the first data item, and recording the value of the first data item and the first validation status of the value of the first data item in the first distributed storage system; and generating an output related to the paper-form data based on the first distributed storage system.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 9 shows a blank paper form overlaid with a location grid and a corresponding filled-in copy of the blank paper form, in accordance with at least some example embodiments.

FIG. 12 shows another user interface providing a paper form display, in accordance with at least some example embodiments.

FIG. 13 is a flowchart of another method, in accordance with at least some example embodiments.

DETAILED DESCRIPTION

Figure 1:
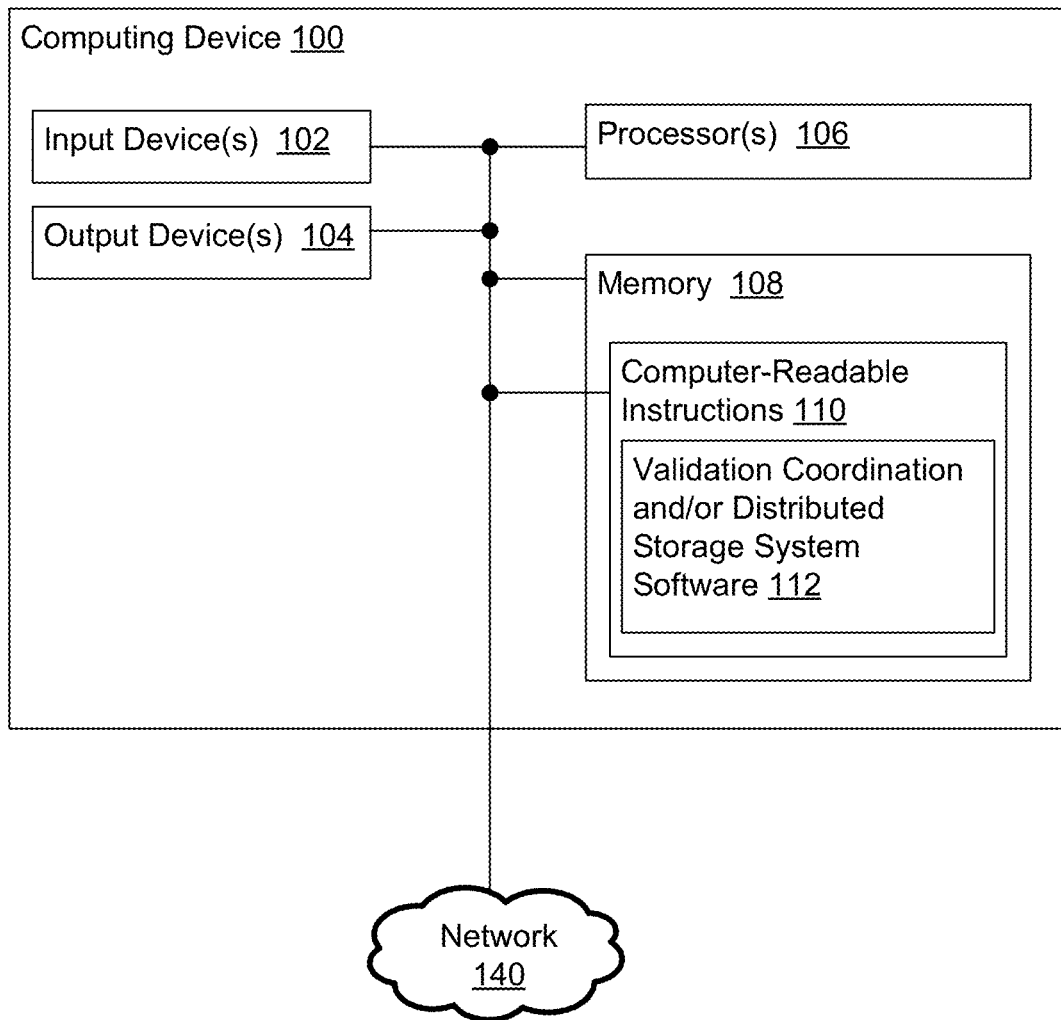
FIG. 1 is a schematic block diagram illustrating a computing device, in accordance with at least some example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Herein are described techniques and systems for validating documents, such as paper-based forms, and for securely storing validated and other information utilizing one or more secure distributed storage systems, perhaps as a distributed ledger. Document validation can involve a human checking data that has been scanned into a computing system. For example, a paper medical record can be scanned into a corresponding data file (or a similar data storage structure) as "paper-form data" using a printing device configured with scanning hardware and/or optical character recognition (OCR) or similar software. Then, to validate the paper medical record and corresponding paper-form data, one or more persons can review data in the data file to verify (or validate) that the paper-form data matches data present on the paper medical record. If the paper-form data differs from corresponding data in the paper medical record, the person can change the paper-form data to be the same as the corresponding data in the paper medical record. For example, suppose a patient's postal code on a paper medical form read "12345" and paper-form data obtained by scanning the paper medical form had a postal code that read "1Z846". Then, a person validating the patient's postal code could review both the paper medical form and the corresponding paper-form data, and change the paper-form data from "1Z846" to "12345". Many other examples of document validation are possible as well.

To ensure security, transparency, and accountability, a data item (or item of data), such as one or more fields of data of a form, database, or other record, can be validated by one or more validation entities (VEs), which can include human information workers, software applications (including artificial intelligence application), and/or other entities. Some data items can be considered to be sensitive data items. As non-limiting examples, sensitive data items can include: data that can identify a person (e.g., a name, an identification number, a passport number), data that can locate a person (e.g., a home address, a work address, current location data for the person), medically-related data about a person, and/or financially-related data (e.g., a bank account number, a credit card number, a credit rating) about a person or other entity. Data that is not considered to be part or all of at least one sensitive data item can be considered as non-sensitive data.

For example, (sensitive) paper-form data can be validated in a distributed manner by segmenting the (sensitive) paper-form data into different segments, portions, items, sub-items, and/or other divisions of the paper-form data and/or the document. Metadata, such as but not limited to, document metadata (e.g., to indicate segments, portions, items, sub-items, and/or other divisions of the document and other data about the document) and location metadata (e.g., to indicate locations of items within a document, locations of distributed storage systems storing the document and/or information about validation entities) for the paper-form data can be generated or otherwise obtained, perhaps at a time that a paper document is scanned to create the paper-form data.

For example, when a paper document is scanned, metadata for the document, including document metadata and location metadata, can be determined. As more particular examples, a name of the document and/or names of items of data within the document can be recorded as document metadata and a location of where text appears within the document can be recorded as location metadata. The location metadata can later be used to reassemble the document from items of data that may be stored in one or more distributed storage systems, as the items of data are identified and attributed to a particular document. The metadata can also include data about which validation entities are utilized to validate items of data obtained from a paper document and/or responses provided by validation entities.

A portion of paper-form data for a document can be sent to a plurality of validation entities, where each validation entity independently receives and responds with a response regarding the received portion of the paper-form data. Each validation entity's response can be compared to responses from other validation entities working on the same portion of the paper-form data. Then, the most commonly chosen response can be considered to be correct. For example, suppose three validation entities are validating a street address and the resulting scanned street address is "123 Owk Ln". Further, suppose that two validation entities submit responses indicating the validated street address is "123 Oak Ln" while the third validation entity submits a response indicating the validated street address is "123 Owl Ln"—then the correct, validated street address can be determined to be "123 Oak Ln".

If the responses indicate uncertainty in validating data or the correct response is deemed uncertain; e.g., by pattern recognition and/or machine learning software, data to be validated can be sent to a second (or, if necessary, third) plurality of validation entities. Once data is determined to be correct, each participating entity can be scored and/or rated.

A validation entity can be rated based on criteria such as correctness of a response, timeliness of the response, and/or other criteria (e.g., first to respond, providing a pre-determined number of successive correct responses). Ratings and/or changes in ratings can then be stored in one or more distributed storage systems; e.g., as metadata. Then, if a rating of a validation entity falls below a threshold rating, the validation entity's access to data, including access to distributed storage systems, can be restricted, suspended, and/or terminated. For example, suppose ratings for validations entities are on a 100 point scale that is based on correctness and/or timeliness, where higher ratings are given for more correct and/or timely validation responses. Also, suppose that two threshold values THR1 and THR2 are utilized, where THR1>THR2; e.g., THR1=60, 65, 66.666, 70, 80, 90, and THR2=50, 54, 57, 60, 70, 75, 90. Then, as a more particular example, let validation entity VE1 have a rating of Rating1. If Rating1 is greater than THR1, then validation entity VE1's access to data is not restricted. If Rating1 is greater than THR2 but less than THR1, then validation entity VE1's access to data may be restricted but not terminated; e.g., VE1 may receive less data to validate, less sensitive data to validate, and/or only non-sensitive data to validate. If Rating1 is less than THR2, then validation entity VE1's access to data may be suspended (e.g., prevented from accessing data temporarily) or terminated (e.g., prevented from accessing data permanently). Other rating systems and uses of rating thresholds are possible as well.

In some examples, data can be classified as sensitive data by pattern recognition and/or machine learning software operating on validated and/or unvalidated data from the above-mentioned paper forms, and perhaps other data; e.g., mapping data, data about financial transactions, data about medical procedures, etc. For example, a paper document can be scanned/captured and run through an OCR engine to generate electronic paper-form data. Then, the pattern recognition and/or machine learning software can operate on the paper-form data to find patterns that can identify sensitive information. For example, the pattern recognition and/or machine learning software can determine patterns such as:

(i) home addresses in the United States are usually identified as:

| [First Name] | [Last Name] | |
|---|---|---|
| [Street Number] | [Street Name] | [Street Identifier] |
| [City], | [State] | [Zip Code] |

(ii) and U.S. Social Security numbers are usually identified as:

| [3 Digits] - | [2 Digits] - | [4 Digits] |
|---|---|---|

Other patterns for sensitive data are possible as well—for example, the pattern recognition and/or machine learning software can be trained to identify different types of sensitive information that are specific to: one or more particular countries, national regions, states, provinces, counties, and/or other geographical regions; one or more languages and/or cultures, one or more persons, companies, corporations, and/or other entities. Other types of sensitive data are possible as well.

As indicated above, paper-form data and/or sensitive data can be divided among validation entities for validation—in some examples, division of data among validation entities can be performed using the pattern recognition and/or machine learning software. A technique for dividing data among validation entities is that no validation entity should have access to more than one [Group] of data in the same line of a table of identified sensitive data—such as the home address and social security tables listed above. That is, a maximum of one [Group] of metadata from different lines can be grouped together and sent to one validation entity for validation; e.g., an example maximum amount of data that can be sent to one validation entity from the two tables listed above using this technique would be: [First Name], [Street Number], [City], and [3 Digits]. Other example maximum amounts of data and/or technique for dividing data among validation entities are possible as well.

Metadata, paper-form data, and/or other data can be securely stored in one or more distributed storage systems. A distributed storage system can be a data structure that stores records of data on multiple computing devices acting as nodes; that is, the records of data are distributed among the nodes. A node can be a computing device configured to perform at least some of the herein-described procedures and techniques for document validation. A herein-described distributed storage system can utilize blockchain technology to provide a "blockchain" that secures data storage and ensures data consistency among the nodes. Blockchain technology can involve operations performed by the multiple nodes upon a "block" or groups of records; e.g., records related to paper-form data and/or metadata, that are linked together to form a blockchain. Blocks of a distributed storage system can be hashed and encoded using a suitable data structure; e.g., a Merkle tree. A Merkle tree or hash tree is a tree whose leaf nodes have labels associated with blocks of data, such as paper-form data and/or metadata, and whose non-leaf nodes are labeled with a cryptographic hash of labels of its child nodes. In some examples, one or more herein-described distributed storage systems can perform some or all of the features of a distributed ledger.

A block of a blockchain can either be an origin block originating the blockchain or a block that includes a hash of a parent block prior to the block in the blockchain—this hash links the block with the parent block, which in turn is linked to another parent block, and so on back to the origin block. In some case, an origin block can be termed as a genesis block. As all blocks but the origin block include a hash of a parent block, to modify the data of a block would involve modifying the hash value stored in a later block which in turn would modify the hash value of an even later block and so on. Thus, by use of blocks chained by hash values of prior blocks, data stored in the blockchain can be secured from tampering; i.e., once a block of data is recorded in the distributed storage system, the data in the recorded block cannot be altered without alteration of all subsequent blocks. In some examples, the nodes providing the distributed storage system can be organized as a peer-to-peer network that use a common protocol for generating, communicating, and validating blocks in the blockchain of the distributed storage system.

Paper-form data and/or metadata, including validated paper-form data for a document that has been determined to be correct, can be stored in a blockchain of a distributed storage system. After all portions of paper-form data are validated, a validated version of the document can be reconstituted using the location metadata to locate one or more distributed storage systems to thereby retrieve the portions of the document stored in the one or more located distributed storage systems. During validation of data, each validation entity can have one or more private and/or public keys for adding data to one or more distributed storage systems. A validation entity can utilize a user interface to validate data; e.g., the user interface can allow reviewing and updating of metadata, paper-form data, and/or portion(s) of scanned-in paper documents in a side-by-side or similar fashion.

Previous document validation procedures can be laborious and expensive, at least since such procedures utilize a secure, centralized location to protect sensitive data and prevent intentional or accidental release of confidential information. The herein-described procedures and techniques for document validation advantageously replace the use of a centralized location for security with a distributed storage system that can utilize blockchain technology for security. Using distributed storage systems for security can favorably lead to creation of an ecosystem of workers working as validation entities (which may include part-time workers) that can validate items (or other components) of sensitive information. By validating a partial record of data without access to the whole record, a validation entity can partially validate the record of data without being able to access the whole record, thereby eliminating the possibility that the validation entity can compromise sensitive customer information. Using distributed storage systems to eliminate (or at least reduce) use of a secure, centralized location for document validation, thereby advantageously reducing costs of data validation on documents, while providing a high level of security, transparency, and accountability of validated data by use of the herein-described distributed storage systems and blockchains. Further, the herein-described procedures and techniques for document validation beneficially maintain the privacy of data in paper documents and in paper-form data during document validation.

II. Computing Device and Printing System Examples

FIG. 1 is a schematic block diagram illustrating computing device 100, in accordance with at least some example embodiments. In some embodiments, computing device 100 can be configured to perform at least part of the herein-described procedures and techniques for document validation and/or functionality related to: a node, network 140, 200, scanning/printing devices (SPDs) 210, 212, 214, 216, computing device 220, distributed storage system server (DSSS) 230, validation entities (VEs) 232, 234, 236, 610, 612, validation coordination server (VCS) 240, methods 300, 1300, forms 410, 910, 920, distributed storage systems (DSSs) 420, 422, 424, 426, 428, 430, 500, scenario 600, and/or user interfaces 1000, 1200.

Computing device 100 can include one or more input devices 102, one or more output devices 104, one or more processors 106 and memory 108. Input devices 102 can include user input devices, network input devices, sensors, and/or other types of input devices. For example, input devices 102 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet® transceiver, a Universal Serial Bus (USB) transceiver, or similar transceiver configurable to communicate via a twisted pair wire, a coaxial cable, a fiber-optic link, or a similar physical connection to a wireline network, such as wired portions of one or more of networks 140, 200 and/or wireless network receivers and/or transceivers, such as a Bluetooth® transceiver, a ZigBee® transceiver, a Wi-Fi® transceiver, a WiMAX™ transceiver, a wireless wide-area network (WWAN) transceiver and/or other similar types of wireless transceivers configurable to communicate via a wireless network, such as wireless portions of one or more of networks 140, 200. Sensors can include devices configured to measure conditions in an environment of computing device 100 and provide data about that environment, such data including, but not limited to, location data, velocity (speed, direction) data, acceleration data, and other data about the environment for computing device 100. Example sensors include, but are not limited to, GPS sensor(s), location sensors(s), gyroscope(s), accelerometer(s), magnetometer(s), camera(s), light sensor(s), infrared sensor(s), and microphone(s). Other input devices 102 are possible as well.

Output devices 104 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of one or more of networks 140, 200 and/or wireless network transmitters and/or transceivers, such as a Bluetooth® transceiver, a ZigBee® transceiver, a Wi-Fi® transceiver, a WiMAX™ transceiver, a wireless wide-area network (WWAN) transceiver and/or other similar types of wireless transceivers configurable to communicate via a wireless network, such as wireless portions of one or more of networks 140, 200. Other types of output devices can include, but are not limited to, vibration devices, haptic feedback devices, and non-visible light emission devices; e.g., devices that emit infra-red or ultra-violet light. Other output devices 104 are possible as well.

Processors 106 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processors 106 can be configured to execute computer-readable instructions 110 that are contained in memory 108 and/or other instructions as described herein.

Memory 108 can include one or more computer-readable storage media configured to store data and/or instructions that can be read and/or accessed by at least one of processors 106. The one or more computer-readable storage media can include one or more volatile and/or non-volatile storage components, such as optical, magnetic, organic or other memory or disc storage, which can be integrated in whole or in part with at least one of processors 106. The computer-readable storage media can include one or more components that store data for short periods of time like register memories, processor caches, and/or random access memories (RAM). The computer-readable storage media can include non-transitory computer readable media that stores program code and/or data for longer periods of time, such as secondary or persistent long term storage; for example, read only memory (ROM), optical or magnetic disks, compact-disc read only memory (CD-ROM). In some embodiments, memory 108 can be implemented using a single physical device (e.g., one optical, magnetic, organic or other memory or disk storage unit), while in other embodiments, memory 108 can be implemented using two or more physical devices.

In particular, memory 108 can store computer-readable instructions 110 that, when executed by one or more of processor(s) 106, can cause a computing device to perform functions, such as but not limited to, functions related to herein-described procedures, techniques, devices, networks, methods, features, and/or scenarios. In some embodiments, computer-readable instructions 110 can include at least instructions for validation coordination and/or distributed storage system software 112. Validation coordination and/or distributed storage system software 112, when executed by processors 106 of computing device 100, provides instructions to computing device 100 to carry out part or all of methods 300 and/or 1300, and/or provide some or all of the functionality described with respect to scenario 600. In some embodiments, computer-readable instructions 110 and/or validation coordination and/or distributed storage system software 112 can include at least instructions to carry out at least part of the herein-described functionality of a node, a scanning/printing device, a computing device, a validation coordination server, a distributed storage system server, a validation entity, and/or a distributed storage system.

Figure 2:
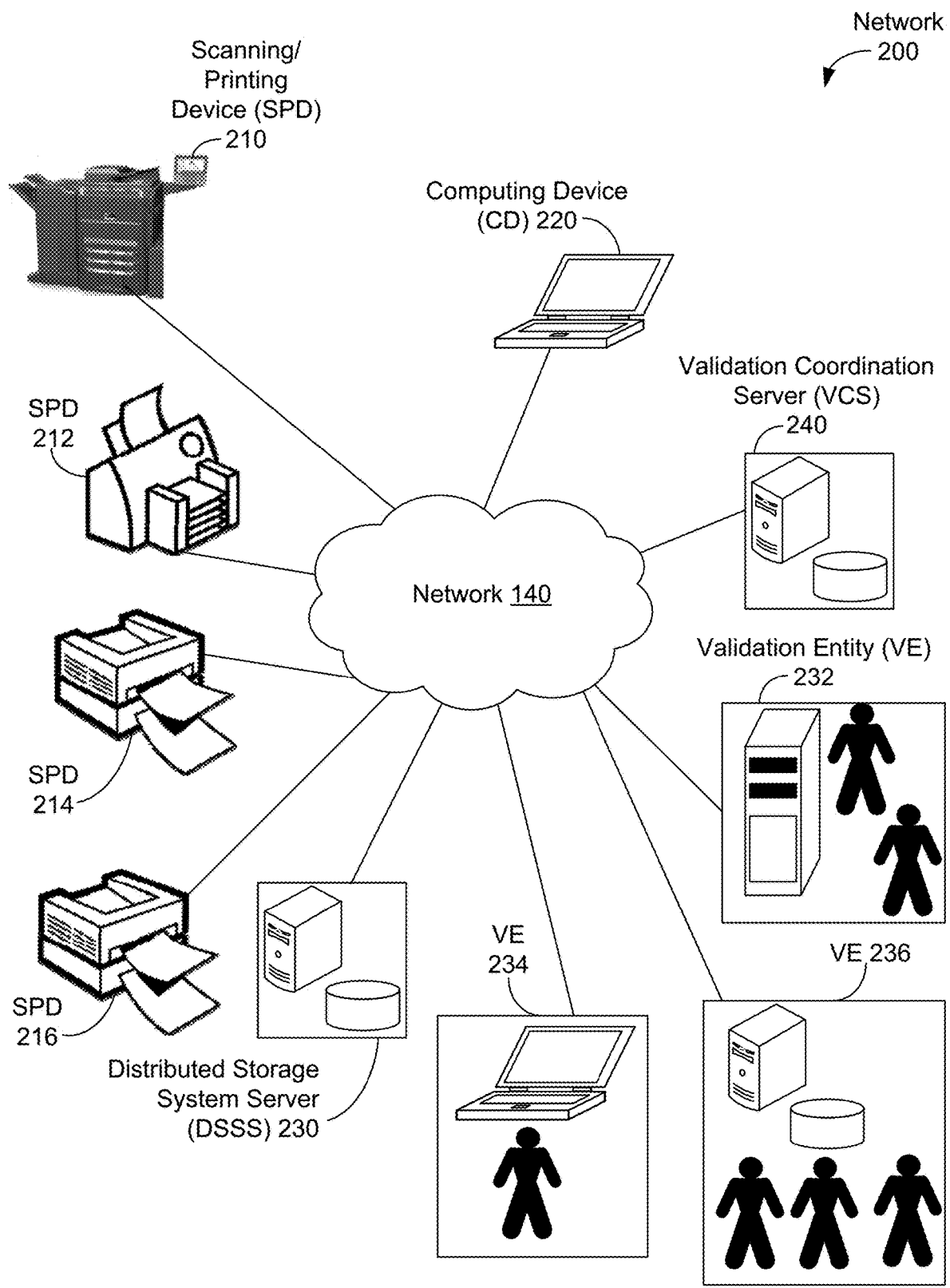
FIG. 2 is a diagram illustrating a network, in accordance with at least some example embodiments.

FIG. 2 is a diagram illustrating network 200, in accordance with at least some example embodiments. Network 200 includes scanning/printing devices 210, 212, 214, 216, computing devices 220, a server computing device acting as distributed storage system server 230, computing devices being used as validation entities 232, 234, 236 and a server computing device acting as a validation coordination server 240. In some examples, network 200 can have more, fewer, and/or different types of nodes, scanning/printing devices, computing devices, server computing devices, and/or other devices than indicated in FIG. 2.

Scanning/printing devices 210, 212, 214, 216 can include components configured to scan, print, copy, e-mail, account for, communicate and/or otherwise process documents and/or files that are originally available either on paper or electronically. For example, some or all of scanning/printing devices 210, 212, 214, 216 can include scanning components for creating electronic copies of original paper documents and/or for generating electronic data via OCR or other techniques from the original paper documents; e.g., generating paper-form data from a paper form or other paper document. After processing by one or more of scanning/printing devices 210, 212, 214, 216, the paper-form data, documents, and/or files can be subsequently available either on paper or electronically, as requested. That is, scanning/printing devices 210, 212, 214, 216 can process a paper document PAPERD or electronic document ED by at least: creating an electronic document ED1 representing the contents of PAPERD (e.g., scan PAPERD to create ED1), making one or more paper copies of PAPERD, printing one or more copies of ED and/or ED1 on one or more types of paper, make one or more electronic copies of ED and/or ED1, change a format of ED and/or ED1 (e.g., perform OCR) scanning, convert a file format used to store ED and/or ED1), maintain remotely-accessible storage (e.g., a document box) enabling other devices than scanning/printing devices 210, 212, 214, 216 to use/access ED and/or ED1, and/or communicate the contents of ED and/or ED1 to/from another device. In some cases, creating the electronic document ED1 representing the contents of PAPERD can include creating paper-form data PFD representing part or all of the contents of PAPERD.

A document box can be storage allocated to an entity (e.g., a user, an administrator, a company, another type of entity) on a printing device, a scanning/printing device, print server, or another device so the entity can keep and maintain documents, files, and/or other data. In some embodiments, the document box can be accompanied by and/or include storage for personal data, such as address book and/or device accounting storage. The document box, address book, and device accounting storage can store one or more documents, files, personal data, and/or other data, such as contacts, usage and usage limits.

In some embodiments, scanning/printing devices 210, 212, 214, 216 can perform other tasks and/or other processing as well. Scanning/printing devices 210, 212, 214, 216 can include products from various manufacturers with variations in color, speed, computing power, functionality, network connectivity, and/or other features.

In some examples, some or all of scanning/printing devices 210, 212, 214, 216 can be connected to network 140 through one or more, possibly different, network protocols. Data can be transmitted between scanning/printing devices 210, 212, 214, 216, computing device 220, distributed storage system server 230, validation entities 232, 234, 236, and/or validation coordination server 240 over wired and/or wireless links between computers, computing devices, nodes, printing devices, scanning/printing devices, servers, and network 140. The format of each respective data transmission between devices in network 200 can include one or more of a variety of different formats including: text formats, image formats, extensible mark-up language (XML), Simple Network Maintenance Protocol (SNMP) formats, database tables, text including OCR'd text, a flat file format, or another format.

Communications between the computers, computing devices, nodes, printing devices, scanning/printing devices, servers, can include: computing device 220, distributed storage system server 230, validation entities 232, 234, 236, and/or validation coordination server 240 sending and/or receiving data for scanning and printing jobs performed by scanning/printing devices 210, 212, 214, 216; scanning/printing devices 210, 212, 214, 216 sending alert, status, error, device information, colorant-usage information, maintenance-event information, and/or other messages to computing device 220; and a document management system (not shown in FIG. 2) to inform other devices about colorant-usage, maintenance, error, and/or other conditions of the printing devices and/or scanning/printing devices; e.g., idle, printing, sleeping, paper jam, low or out of paper, low or out of toner/ink, etc.; and scanning/printing devices 210, 212, 214, 216, computing device 220, distributed storage system server 230, validation entities 232, 234, 236, and/or validation coordination server 240 communicating paper-form data, validation information, portions of (e.g., blocks, block header) and/or entire distributed storage systems, block-chain-related data, and/or other data related to validating data and/or distributed storage systems using network 140. Other communications between nodes, scanning/printing devices 210, 212, 214, 216, computing devices 220, distributed storage system server 230, validation entities 232, 234, 236, and/or validation coordination server 240 are possible as well, such as, but not limited to, communications related to one or more maintenance and management operations.

Computing devices 220 can create, obtain, update, display, and/or delete data (and perhaps related software) for configurations of network 200. Example data for configurations of network 200 includes, but is not limited to: data for configuring devices in network 200; e.g., data for scanning/printing devices 210, 212, 214, 216, data for configuring network protocols (e.g., File Transfer Protocol (FTP), HyperText Transfer Protocol (HTTP), Java Message Service (JMS), Kyocera Page Description Language (KPDL™), Private Communications Technology (PCT), Adobe® Page Description Format (PDF), Simple Object Access Protocol (SOAP), Short Message Service (SMS™), Simple Message Transfer Protocol (SMTP), SNMP, Transfer Control Protocol/Internet Protocol (TCP/IP), User Datagram Protocol (UDP), Lightweight Directory Access Protocol (LDAP), MQ, and/or other protocols), access-management related data for clients and/or servers; (e.g., passwords, signatures, credentials, certificates, subscriptions, licenses, and/or tokens related to accessing part or all of the functionality of network 140 and/or cloud-based services, software and/or solutions) and data for customizing, configuring and managing applications on devices/servers of networks 200.

Distributed storage system server 230 can be utilized to provide, restrict, suspend, and/or terminate access, including but not limited to secure access, to one or more distributed storage systems by one or more nodes, scanning/printing devices, computing devices, validation entities, distributed storage systems, distributed storage system servers and/or networks. In some examples, distributed storage system server 230 can provide storage for some or all of the distributed storage system(s); while in other examples, distributed storage system server 230 can communicate with one or more other computing and/or data storage devices that can provide storage for some or all of the distributed storage system(s). Distributed storage system server 230 can also create, update, review, and/or delete some or all of the herein-described metadata; e.g., document metadata, location metadata, and/or other metadata for paper documents, paper-form data, and/or distributed storage systems. In some examples, some or all of the metadata can be stored in one or more of the distributed storage system(s). In other examples, some or all of the other devices in network 200 (e.g., some or all of scanning/printing devices 210, 212, 214, 216, computing device 220, distributed storage system server 230, validation entities 232, 234, 236, and/or validation coordination server 240) can create, update, review, delete, and/or store some or all of the herein-described metadata and/or data of distributed storage systems.

Validation entities 232, 234, 236 can validate part or all of a paper document and/or related paper-form data and communicate information related to validation of part or all of a paper document and/or related paper-form data with some or all of scanning/printing devices 210, 212, 214, 216, computing device 220, validation entities 232, 234, 236, and/or validation coordination server 240 using network 200. In particular, data for validating paper documents can be communicated using network 200. For example, data related to one or more paper documents, paper-form data, metadata, validation entity ratings, validation inputs, validation responses, and/or data items.

Validation coordination server 240 can be utilized to select, rate, communicate with, restrict communications, suspend communications, and/or terminate communications with one or more scanning/printing devices, computing devices, nodes, validation entities, distributed storage systems, distributed storage system servers and/or networks to carry out the herein-described procedures and techniques for document validation; e.g., to validate part or all of a paper document and/or related paper-form data, rate one or more validation entities, and provide access to validated data. In particular, validation coordination server 240 can be utilized to select, rate, and communicate with validation entities 232, 234, 236, and/or to restrict communications, suspend communications, and/or terminate communications between one or more validation entities, such as validation entities 232, 234, 236, and one or more distributed storage systems, perhaps by restricting, suspending, and/or terminating communications between one or more validation entities and distributed storage system server 230.

Data for distributed storage systems can be communicated using network 200. This data about one or more distributed storage systems can include, but is not limited to, data related to paper documents, paper-form data, and/or validating paper documents and/or paper-form data that is be stored in the one or more distributed storage systems, blocks, hash values, timestamps, block headers, notifications, (e.g., a notification of an added block), distributed storage system queries and query responses, cryptographic keys, and entire distributed storage systems. Other data can be communicated using network 200 as well.

In some embodiments, one or more additional computing devices, e.g., one or more servers, nodes, and/or other computing devices, can be used in network 200 to perform additional functions, such as functions for one or more document solutions and managed print services, prediction-related functions, act as databases, provide machine learning functionality, and other functions.

III. Techniques for Using Distributed Storage Systems with Blockchains

Figure 3:
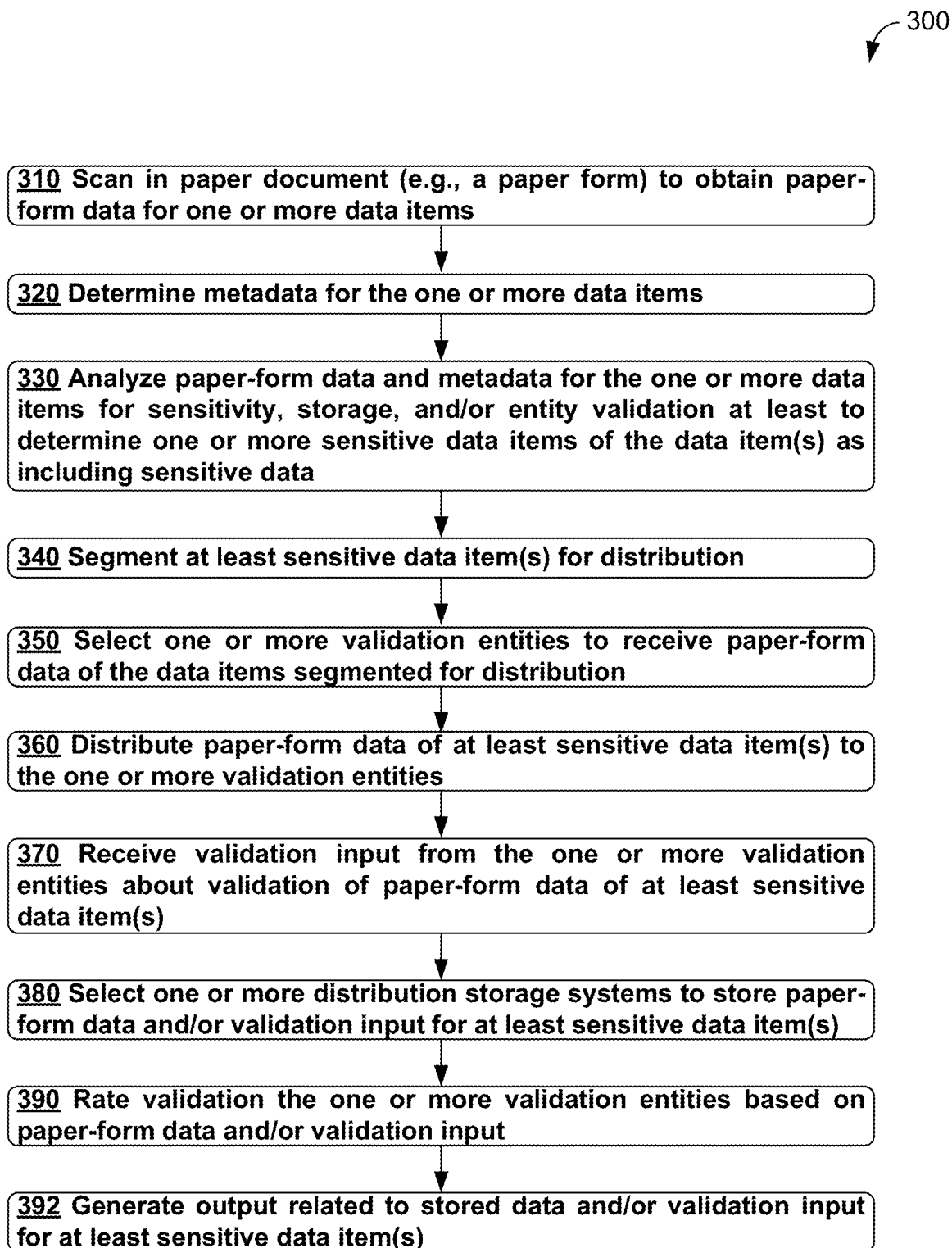
FIG. 3 is a flowchart of a method, in accordance with at least some example embodiments.

FIG. 3 is a flowchart of method 300, in accordance with at least some example embodiments. Method 300 can be carried out by a computing device acting as a node, such as computing device 100 discussed above.

Method 300 can begin at block 310, where the node can scan in one or more paper documents, such as one or more paper forms, to obtain paper-form data for one or more data items. For example, the node can include and/or otherwise have access to one or more scanning components; then, the node can scan in one or more paper documents using the one or more scanning components.

The paper-form data can include data having one or more types of data, including, but not limited to: numerical data, character data, alphanumerical data, image data, binary data, image data, and/or other types of data. In some examples, at block 310, the node can receive the paper-form data for the for one or more data items after another device, such as a scanning/printing device, has scanned in the paper document(s).

At block 320, the node can determine metadata for the one or more data items. The metadata can include information about the data item(s) including but not limited to information about: name(s) of the data item(s), ranges of values of the data item(s), sensitivity of data item(s), type(s) of data stored in the data item(s), one or more documents that include the data item(s), locations where the data item(s) are located on one or more documents, validation information about the data item(s), and locations (e.g., names of devices, names of storage systems, block addresses) where the data item(s) are stored. For example, the metadata can include location metadata and/or document metadata as discussed above.

At block 330, the node can analyze paper-form data and metadata for the one or more data items for sensitivity, storage, and/or entity validation at least to determine one or more sensitive data items of the data item(s) as including sensitive data.

For example, the data item(s) can include sensitive data and perhaps non-sensitive data. Then, a sensitive data item can be a data item storing sensitive data and a non-sensitive data item can be a data item storing non-sensitive data. As non-limiting examples, sensitive data can include: data that can identify a person (e.g., a name, an identification number, a passport number), data that can locate a person (e.g., a home address, a work address, current location data for the person), medically-related data about a person, and/or financially-related data (e.g., a bank account number, a credit card number, a credit rating) about a person or other entity. Data that is not considered to be sensitive data can be considered as non-sensitive data.

At block 340, the node can segment at least sensitive data item(s) for distribution; e.g., distribution of some or all of the one or more data items, including at least one sensitive data item, to one or more validation entities. For example, the node can use the pattern recognition and/or machine learning software discussed above to select data items of the paper-form data as sensitive data items and/or segment data items of the paper-form data for distribution.

At block 350, the node can select one or more validation entities to receive paper-form data of the data item(s) segmented for distribution. For example, suppose the paper-form data includes data for N data items, and only N/2 of the data items are selected at block 340 Then, the node can select one or more validation entities to receive (and subsequently validate) paper-form data values of the N/2 data item(s) segmented for distribution. In some examples, a validation entity can be selected to receive paper-form data values of only one data item; while in other examples, a validation entity can be selected to receive paper-form data values for multiple data items. In some examples, one validation entity can be selected to review paper-form data for a particular data item of the data item(s); while in other examples, multiple validation entities can be selected to review paper-form data for the particular data item. In some cases, the node can select one or more validation entities to receive the paper-form data based on the metadata for the one or more data items.

At block 360, the node can distribute paper-form data of at least sensitive data item(s) to the one or more validation entities. For example, the node can provide a user interface to a validation entity that allows the validation entity to review, validate, and/or change values of one or more data items of paper-form data. As another example, the node can send values of the one or more data items of paper-form data to (a node) of the validation entity and the validation entity can use a user interface to review, validate, and/or change one or more of the received values of data items of paper-form data.

At block 370, the node can receive validation input from the one or more validation entities about validation of paper-form data of at least sensitive data item(s). The validation input can include: input that validates correctness of values of one or more data items, input that corrects values of one or more data items, input that changes names of one or more data items, input that indicates a uncertainty (or certainty) value about a correctness of values uncertain, and/or other inputs related to validation of paper-form data of at least sensitive data item(s).

At block 380, the node can select one or more distributed storage system(s) to store paper-form data and/or validation input for at least sensitive data item(s).

At block 390, the node can rate the one or more validation entities based on paper-form data and/or validation input. The node can rate a validation entity based on criteria such as correctness of input, such as a response that includes validation input, timeliness of input, and/or other criteria (e.g., first to respond, providing a pre-determined number of successive correct responses). Ratings and/or changes in ratings can then be stored in one or more distributed storage systems; e.g., as metadata. Then, if a rating of a validation entity falls below a threshold rating, the validation entity's access to data, including access to distributed storage systems, can be restricted, suspended, and/or terminated as discussed above.

For example, suppose a plurality of validation entities includes validation entities VE1 and VE2. Then, the node can receive a first value V1 of a data item DF1 and a first validation status VS1 of the value of DF1 from VE1, and can receive a second value V2 of data item DF1 and a second validation status VS2 of the value of DF1 from VE2. Then, the node can rate validation entities VE1 and VE2 based on correctness of the values V1 and V2. In particular, if V1 and V2 are the same, then the node can increase the ratings of VE1 and/or VE2, as both VE1 and VE2 agree on the correctness of the value of data item DF1. Also, if V1 and V2 are not the same, then the node can decrease the ratings of VE1 and/or VE2 as VE1 and VE2 do not agree on the correctness of the value of data item DF1, and so one or both of VE1 and VE2 is likely to have provided an incorrect value (as respective values V1 and V2) of data item DF1. Other rating systems and uses of rating thresholds are possible as well.

At block 392, the node can generate output related to stored data and/or validation input for at least sensitive data item(s). For example, the node can display, generate, communicate, and/or otherwise provide an output of validated paper-form data, such as a generated document having validated and/or other paper-form data, a display of a document having validated paper-form data, a display of the paper-form data, and/or a display of the paper form. In some examples, the paper document can include a first item at a first location within the paper document; then, the generated document having validated and/or other paper-form data and/or the display of the paper-form data can include a second item that includes data from the first item, and wherein the second item is within the generated document and/or the display of paper-form data at a second location that is based on the first location.

Figure 4:
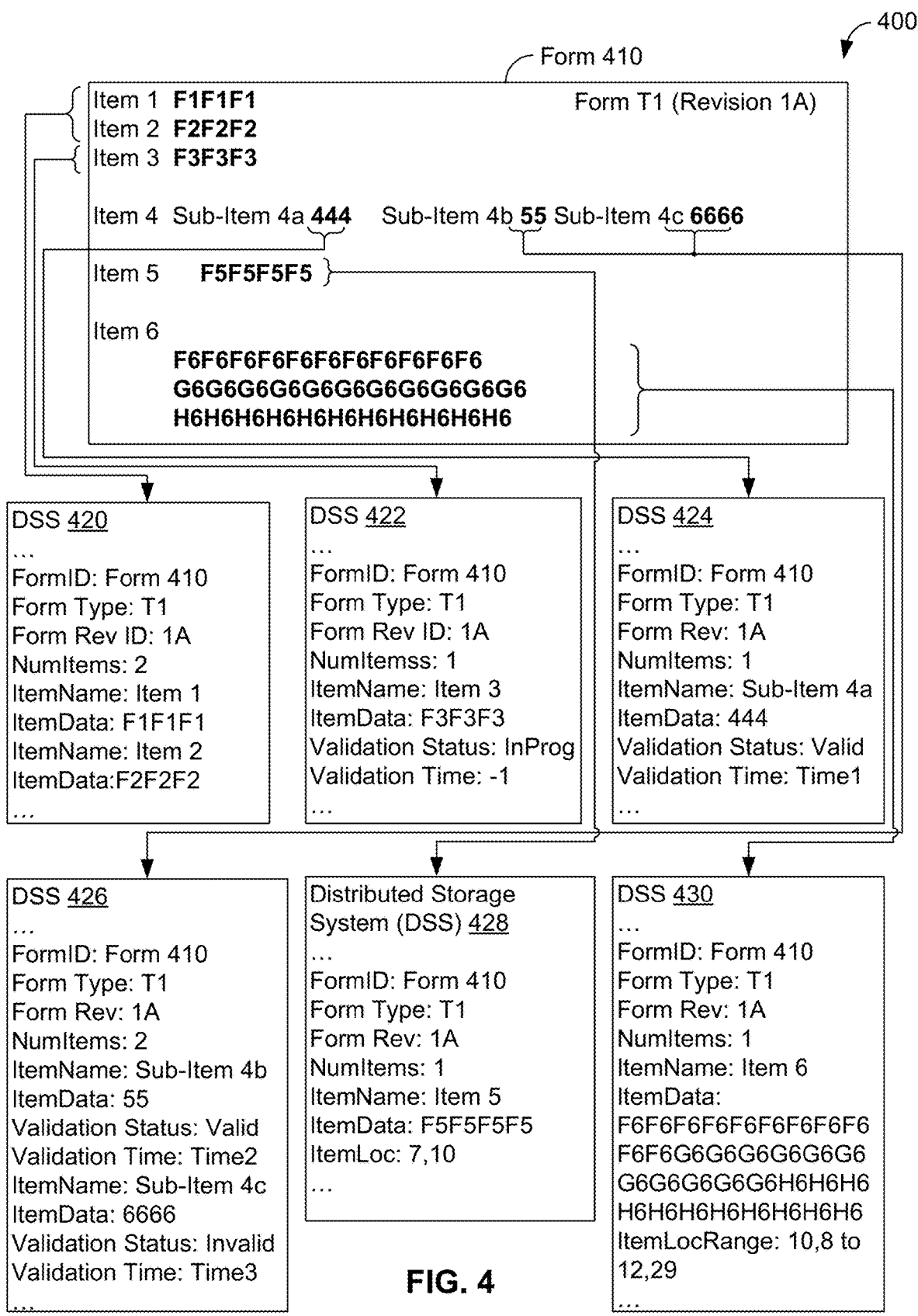
FIG. 4 shows a diagram showing paper-form data for a form stored in a plurality of distributed storage systems, in accordance with at least some example embodiments.

FIG. 4 shows diagram 400 of paper-form data for form 410 stored in a plurality of distributed storage systems 420, 422, 424, 426, 428, 430, in accordance with at least some example embodiments. FIG. 4 shows that form 410 has a title "Form T1", a revision number "Revision 1A", and six items "Item 1", "Item 2", "Item 3", "Item 4", "Item 5", "Item 6", where each of Items 1, 2, 3, 5, and 6 have zero sub-items; that is, Items 1, 2, 3, 5, and 6 are unitary items, and Item 4 has three sub-items "Sub-Item 1", "Sub-Item 2", and "Sub-Item 3". Each of Items 1, 2, 3, and 5 is shown in FIG. 4 as having a value with six characters of data; e.g., "Item 1" is shown having "F1F1F1" with six alphanumeric characters of data, "Item 2" is shown having a value "F2F2F2" with six alphanumeric characters of data, "Item 3" is shown having a value "F3F3F3" with six alphanumeric characters of data, and "Item 5" is shown having a value "F5F5F5" with six alphanumeric characters of data. The three sub-items of "Item 4" are of different sizes—"Sub-Item 1" has four numeric characters of data "444", "Sub-Item 2" has two numeric characters of data "55", and "Sub-Item 3" has four numeric characters of data "6666". In some examples, some or all of Sub-Items 1, 2, and 3 can be represented by respective numbers, rather than by characters. And, "Item 6" has three lines of values, each having twenty-two alphanumeric characters of data; e.g., a first line of Item 6 has a value of "F6F6F6F6F6F6F6F6F6F6F6", a second line of Item 6 has a value of "G6G6G6G6G6G6G6G6G6G6G6", and a third line of Item 6 has a value of "H6H6H6H6H6H6H6H6H6H6H6". Other example items, sub-items, and forms are possible as well.

Paper-form data and related metadata can be obtained from form 410. For example, paper-form data of "F1F1F1" for "Item 1" can be obtained by scanning and/or performing optical character recognition of a paper copy of form 410. Also, metadata for the paper-form data of Item 1 can be determined—such metadata can include, but is not limited to a form identifier or title for form 410 (as form 410 includes Item 1), a form type for form 410, a form revision identifier for form 410 name of Item 1, a number of items and/or sub-items of form 410, an item location of Item 1 on form 410, a size of paper-form data (e.g., a number of characters), a sensitivity status (e.g., sensitive data or non-sensitive data) related to Item 1, a validation status (e.g., validated, not validated, incorrect/invalid data, validation in progress, ineligible for validation) related to Item 1, a validation time related to Item 1, a validation entity that validated to Item 1, and/or a time of obtaining/scanning form 410 and/or Item 1. The metadata can be determined at various times; e.g., at a time of scanning and/or performing optical character recognition, at a validation time, etc. Additional information about metadata is provided above in the context of at least block 320 of FIG. 3.

Paper-form data and related metadata can be stored in one or more distributed storage systems. For example, diagram 400 of FIG. 4 illustrates that paper-form data and metadata for form 410 is stored in six distributed storage systems 420, 422, 424, 426, 428, 430. In some examples, paper-form data and/or metadata can be provided to a server, such as distributed storage system server 230, which then selects a distributed storage system and stores the paper-form data and/or metadata in the selected distributed storage system.

In other examples, one or more nodes (and perhaps other computing and/or storage devices) can store paper-form data and/or metadata directly in the distributed storage system without first providing the paper-form data and/or metadata to a server; in these examples, a distributed storage system server can provide information about a distributed storage system for storing paper-form data and/or metadata (e.g., a computer-accessible location of the distributed storage system, a private and/or a public key for encrypting and/or decrypting data of the distributed storage system) to the node(s). Then, the node can use the information about a distributed storage system to store the paper-form data and/or metadata. Other examples of storing paper-form data and/or metadata in distributed storage systems are possible as well.

In the example illustrated by diagram 400, distributed storage system 420 is used to store paper-form data and metadata related to Items 1 and 2 of form 410. In particular, FIG. 4 shows that distributed storage system 420 at least stores metadata about form 410 including a "FormID" (form identifier) of "Form 410", a "Form Type" of "T1", a "Form Rev ID" (form revision identifier) of "1A". Distributed storage system 420 also indicates storage of a "NumItems" (number of items) of "2" items of data from form 410: metadata for a first stored item including a "ItemName" of "Item 1" and paper-form data for the first stored item stored as "ItemData" of "F1F1F1", and metadata for a second stored item including a "ItemName" of "Item 2" and data for the second stored item stored as "ItemData" of "F2F2F2".

Distributed storage system 422 at least stores the same metadata about form 410 discussed above in the context of distributed storage system 420. Distributed storage system 422 also indicates storage of a "NumItems" of "1" item of data from form 410: paper-form data for the item stored in distributed storage system 422 as "ItemData" of "F3F3F3", and metadata for the stored item including a "ItemName" of "Item 3", a "Validation Status" of "InProg" (validation in progress) and a "Validation Time" of "−1", indicating that the "Item 3" has not yet been validated.

Distributed storage system 424 at least stores the same metadata about form 410 discussed above in the context of distributed storage system 420. Distributed storage system 424 also indicates storage of a "NumItems" of "1" item of data from form 410: paper-form data for the item stored in distributed storage system 424 as "ItemData" of "444", and metadata for the stored item including a "ItemName" of "Sub-item 4a", a "Validation Status" of "Valid" (the data has been validated to be correct), and a "Validation Time" of "Time1", indicating that Time1 is a time that the paper-form data stored as Sub-item 4a was validated to be correct.

Distributed storage system 426 at least stores the same metadata about form 410 discussed above in the context of distributed storage system 420. Distributed storage system 426 also indicates storage of "NumItems" of "2" items of data from form 410. Paper-form data for a first stored item of distributed storage system 426 is stored as "ItemData" of "55", and metadata for the first stored item includes a "ItemName" of "Sub-item 4b", a "Validation Status" of "Valid", and a "Validation Time" of "Time2". Also, paper-form data for a second stored item of distributed storage system 426 is stored as "ItemData" of "6666", and metadata for the second stored item includes a "ItemName" of "Sub-item 4c", a "Validation Status" of "Invalid" (validation of the data has been attempted and indicates the paper-form data for the second stored item was deemed to be incorrect), and a "Validation Time" of "Time3" indicating a time when the paper-form data was deemed to be incorrect.

Distributed storage system 428 at least stores the same metadata about form 410 discussed above in the context of distributed storage system 420. Distributed storage system 428 also indicates storage of a "NumItems" of "1" item of data from form 410: paper-form data for the item stored in distributed storage system 428 as "ItemData" of "F5F5F5", and metadata for the stored item including a "ItemName" of "Item 5" and a "ItemLoc" (item location) for a starting location of the stored paper-form on form 410 of "7,10". In the example illustrated by diagram 400, locations are provided using a pair of numbers (row, col), based on character counts within form 410, where row is a one-based row number on form 410 and where col is a one-based column number on form 410. For example, "Item 3" starts on row 3, column 1 and the paper-form data for "Item 3" starts on row 3, column 9, and ends on row 3, column 14. An item location of "7, 10" as shown in distributed storage system 428 indicates a starting location of paper-form data for item 10 at row 7, column 10 of form 410.

Distributed storage system 430 at least stores the same metadata about form 410 discussed above in the context of distributed storage system 420. Distributed storage system 422 also indicates storage of a "NumItems" of "1" item of data from form 410: paper-form data for the item stored in distributed storage system 422 as "ItemData" of "F6F6F6F6F6F6F6F6F6F6F6G6G6G6G6G6G6G6G6- G6G6G6H6H6H6H6H6H6H6H6H6 . . . " and metadata for the stored item including a "ItemName" of "Item 5" and a "ItemLocRange" (item location range) on form 410 of "10,8 to 12,29". In the example illustrated by diagram 400, a location range is specified using a two pairs of numbers (row1, col1), and (row2, col2), where each of row1, row2, col1, and col2 are based on character counts within form 410, where each of row1 and row2 is a one-based row number on form 410 and where each of col1 and col2 is a one-based column number on form 410, and where (row1, col1) specify a starting location of the paper-form data for the item, and where (row2, col2) specify a ending location of the paper-form data for the item. For the example of Item 6 as stored in distributed storage system 430, the item location range of "10,8" to "12,29" indicates that paper-form data of Item 6 can be found starting on row 10, column 8 of form 410 and ending on row 12, column 29 of form 410. Other techniques for specifying locations within forms, starting locations within forms, ending locations within forms, and/or location ranges within forms are possible as well.

Figure 5:
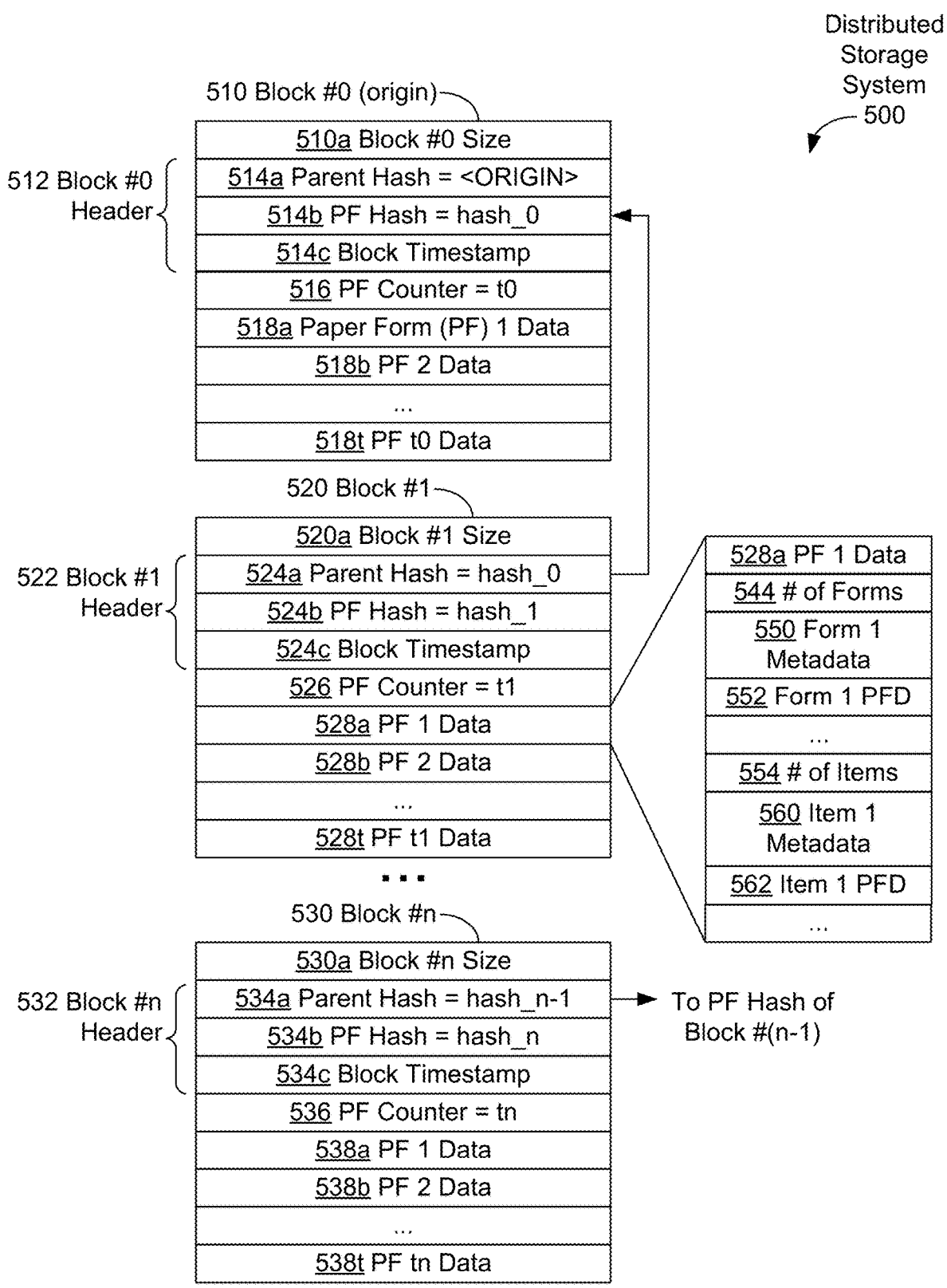
FIG. 5 is a diagram of a distributed storage system, in accordance with at least some example embodiments.

FIG. 5 is a diagram of a distributed storage system 500, in accordance with at least some example embodiments. Distributed storage system 500 can be shared or distributed with multiple nodes. In other examples, a storage system based on distributed storage system 500 can be stored on only one node, and thereby not be distributed.

Distributed storage system 500 includes n blocks that include block 510 numbered as block #0, block 520 numbered as block #1, and block 530 numbered as block # n. Each of blocks 510, 520, and 530 is formatted using a format that includes a number of items of data. For example, block 510 has block size item 510a, a parent hash item 514a, a paper-form (PF) hash item 514b, a block timestamp item 514c, a paper-form counter item 516, and items 518a, 518b . . . 518t for storing paper-form data and/or metadata in block 510. Similarly, block 520 has block size item 520a, parent hash item 524a, paper-form hash item 524b, block timestamp item 524c, paper-form counter item 526, and items 528a, 528b . . . 528t of paper-form data for storing paper-form data and/or metadata in block 520. Further, block 530 has size item 530a, parent hash item 534a, paper-form hash item 534b, block timestamp item 534c, paper-form counter item 536, and items 538a, 538b . . . 538t of paper-form data for storing paper-form data and/or metadata in block 530.

A block size item, as illustrated by block size items 510a, 520a, 530a, can record a size; e.g., in bytes or other data storage units, of a block in distributed storage system 500. For example, if block #0 is 1536 bytes in size, block size item 510a can have a value of 1536. As another example where the data storage units are bits and where 8-bit bytes are used, if block #0 is 1536 bytes in size, block size item 510a can have a value of 12288. Other examples, e.g., using words as storage units, are possible as well.

A parent hash item, as illustrated by parent hash items 514a, 524a, 534a, can record a hash value for the paper-form data and/or metadata and/or stored in paper-form data items of a prior or parent block. In the origin block—block #0 labeled block 510 in FIG. 5—the parent hash value can have a predetermined value shown as "<ORIGIN>" in parent hash item 514a of FIG. 5. The predetermined value can be a fixed value; e.g., 0, −1, or another number, a hash value calculated for a predetermined data string; e.g., a hash value of a known phrase or other group of words, such as "This is the parent hash string.", or another predetermined value; e.g., a predetermined number of digits of a well-known value such as π or e.

A prior block to block B is a block created and placed into distributed storage system 500 before block B. Then, a parent block B1 to a block, such as block B, is an immediately prior block; that is, block B1 is the block created and placed into distributed storage system 500 directly before block B. For example, block 510 is prior to blocks 520 and 530, but is only immediately prior to block 520 and thus block 510 is the parent block for block 520. In cases where n>2, block 520 would not be the parent block to block 530; rather, block 520 would be the parent block to block #2 (block #2 not shown in FIG. 5 for the example where n>2).

In all other blocks than the origin block, a parent hash item can store a hash value of a parent block of distributed storage system 500. For example, parent hash item 524a of block 520 can store a value "hash 0" that is the hash value stored for paper-form data and/or metadata stored in parent block 510, which also stores the value "hash 0" in paper-form hash item 514b. Thus, each block in distributed storage system 500 includes information about a parent block, except for block 510 (which is the origin block for distributed storage system 500).

A paper-form hash item, as illustrated by paper-form hash items 514b, 524b, 534b, can be a hash value for the paper-form data and/or metadata stored in paper-form data items. In some cases, the paper-form hash value can be a hash value for the data stored in a paper-form counter item as well as the paper-form data and/or metadata stored in paper-form data items.

A hash value in distributed storage system 500; e.g., a hash value stored in a parent hash item, a hash value stored in a paper-form hash item, can be calculated using a hash function. For example, the hash function can include a secure hash function that is based on a secure hash algorithm. One set of secure hash algorithms include the Secure Hash Algorithm (SHA) family of algorithms published by the National Institute of Standards and Technology (NIST), such as the family including the SHA-0, SHA-1, SHA-2, SHA-3, SHA256, SHA384, and SHA512 secure hash algorithms.

The secure hash function can receive an input, such an input including paper-form data and/or metadata, and generate a corresponding fixed-size output hash value. To calculate hash values, a hash function can perform a series of operations on the input; e.g., permute portions (e.g., bytes) of the input, perform bit manipulations, add/subtract/multiply/divide by pre-determined or other values, execute other functions on part or all of the input, etc.

The hash function can be selected to be secure; in this context, a secure hash function is a function that is difficult to invert, and to have a large enough range of output hash values to make collisions, or two different inputs with the same output hash values, unlikely. In the context of distributed storage system 500, the input, such as paper-form data and/or metadata, can be verified as not having been modified by recalculating the hash value using the secure hash function and comparing the recalculated hash value to the hash value for the input stored in distributed storage system 500—if the recalculated hash value equals the hash value stored in distributed storage system 500, the input has very likely not been modified; otherwise, the input has very likely been modified.

In one example, the SHA256 secure hash algorithm can be used by a hash function to generate cryptographically secure hash values that can be used as hash values in distributed storage system 500. Other example uses of secure hash algorithms, other secure hash algorithms (e.g., the Message Digest 4 and 5 (MD4 and MD5) secure hash algorithms; the BLAKE family of secure hash algorithms, the RACE Integrity Primitives Evaluation Message Digest (RIPEMD) family of secure hash algorithms), other hash functions, and/or other hash values for distributed storage system 500 are possible as well.

A block timestamp item, as illustrated by block timestamp items 514c, 524c, 534c, can record a time of creation of the block.

To communicate information about a block in distributed storage system 500 without sending a complete block, a block header can be communicated. For example, to verify, validate, or otherwise provide information about a block B, the block header for block B can be communicated. The block header for block B can include a parent hash item value for block B, a paper-form hash item value for block B, and block timestamp value for block B. For example, FIG. 5 shows block #0 header 512 for block #0 510 that includes values of parent hash item 514a, paper-form hash item 514b, and block timestamp item 514c. FIG. 5 also shows block #1 header 522 for block #1 520 that includes values of parent hash item 524a, paper-form hash item 524b, and block timestamp item 524c and shows block # n header 532 for block # n 530 that includes values of parent hash item 534a, paper-form hash item 534b, and block timestamp item 534c. In other examples, more, less, and/or different data can be in a block header.

A paper-form counter item, as illustrated by paper-form counter items 516, 526, 536, can include data about a number, or count, of amounts of paper-form data and/or metadata stored in a block of distributed storage system 500. For example, if block #0 stores 13 amounts of paper-form data and/or metadata, then paper-form counter item 516 can be set to a value t0=13. Each block of distributed storage system 500 can store a different number of amounts of paper-form data and/or metadata depending on the size of the block.

A paper-form data item, as illustrated by items 518a, 518b . . . 518t; 528a, 528b . . . 528t; 538a, 538b . . . 538t, can store information about paper-form data and/or metadata. For example, a paper-form data item can store paper-form data, metadata related to the paper-form data, and/or metadata about a block or a distributed storage system; examples of metadata about a block or distributed storage system include, but are not limited to, timestamps, sending node data, employee identification data, validation entity identification data, organization identification data, and cryptographic keys related to one or more blocks and/or one or more distributed storage systems.

The paper-form data and/or metadata stored in a paper-form data item can be stored in specific data and metadata items. For example, at right of FIG. 5, paper-form data item 528a has been expanded to show that paper-form data "PF1 Data" includes a number of forms item 544, form 1 metadata item 550, form 1 paper-form data (PFD) 552, number of items (for form 1) item 554, item 1 (of form 1) metadata 560, and item 1 (of form 1) paper-form data 562. Number of forms item 544 can indicate how many forms have data stored in paper-form data item 528a; e.g., if paper-form data item 528a stores data from three different forms, number of forms item 544 can be set to three.

Form 1 metadata item 550 can include metadata about a (first) form whose data is stored in paper-form data item 528a. Metadata about forms and paper-form data is discussed above in more detail at least in the context of FIGS. 3 and 4. Form 1 paper-form data (PFD) 552 can include paper-form data obtained from a (first) form and stored in paper-form data item 528a. Paper-form data is discussed above in more detail at least in the context of FIGS. 3 and 4.

Number of items (for form 1) item 554 can include a count or number of items of the (first) form whose metadata and/or paper-form data is stored in paper-form data item 528a. Item 1 (of form 1) metadata 560 can store metadata for a first item of the (first) form whose metadata and/or paper-form data is stored in paper-form data item 528a. Item 1 (of form 1) paper-form data 562 can store paper-form data for the first item of the (first) form whose metadata and/or paper-form data is stored in paper-form data item 528a. As indicated in FIG. 5, data for additional forms and/or items of data can be stored in can store metadata for a first item of the (first) form whose metadata and/or paper-form data is stored in paper-form data item 528a and/or other data items of distributed storage system 500. In some examples, a block of paper-form data can only store data from one form, and therefore some of the data shown in FIG. 4; e.g., number of forms item 544, may not be present in these examples.

In other examples, a block in distributed storage system 500 can include more, fewer, and/or different items of data. For example, in particular examples, each block of distributed storage system 500 can have the same size; e.g., each of block size items 510a, 520a, 530a have the same value. In more particular of these examples, each amount of paper-form data and/or metadata in distributed storage system 500 has the same size when stored in a block—then, as blocks and stored amounts of paper-form data and/or metadata have fixed sizes, the number of amounts of paper-form data and/or metadata stored in a block is a constant value, and so each of paper-form counter items 516, 526, 536 has the same values. In some of these examples, block size items and/or paper-form counter items can be omitted from blocks in distributed storage system 500 as being redundant. In still other examples, amounts of paper-form data and/or metadata as stored can have different sizes; then, a block of distributed storage system 500 can have items of data related to the size of each amount of paper-form data and/or metadata stored in paper-form data items within the block. Many other examples of more, fewer, and/or different items of data are possible as well.

In some blockchain examples, a challenge value, such as a value representing a solution to a pre-determined (difficult) problem, has to be provided by a node prior to the node creating a block; e.g., a challenge value has to be "mined" or computed to earn the right to create a block. In the example storage system shown in FIG. 5, no challenges are recorded or required for block creation. In other embodiments, a challenge can be required and/or one or more corresponding challenge values can be recorded with a block as part of block creation.

Figure 6:
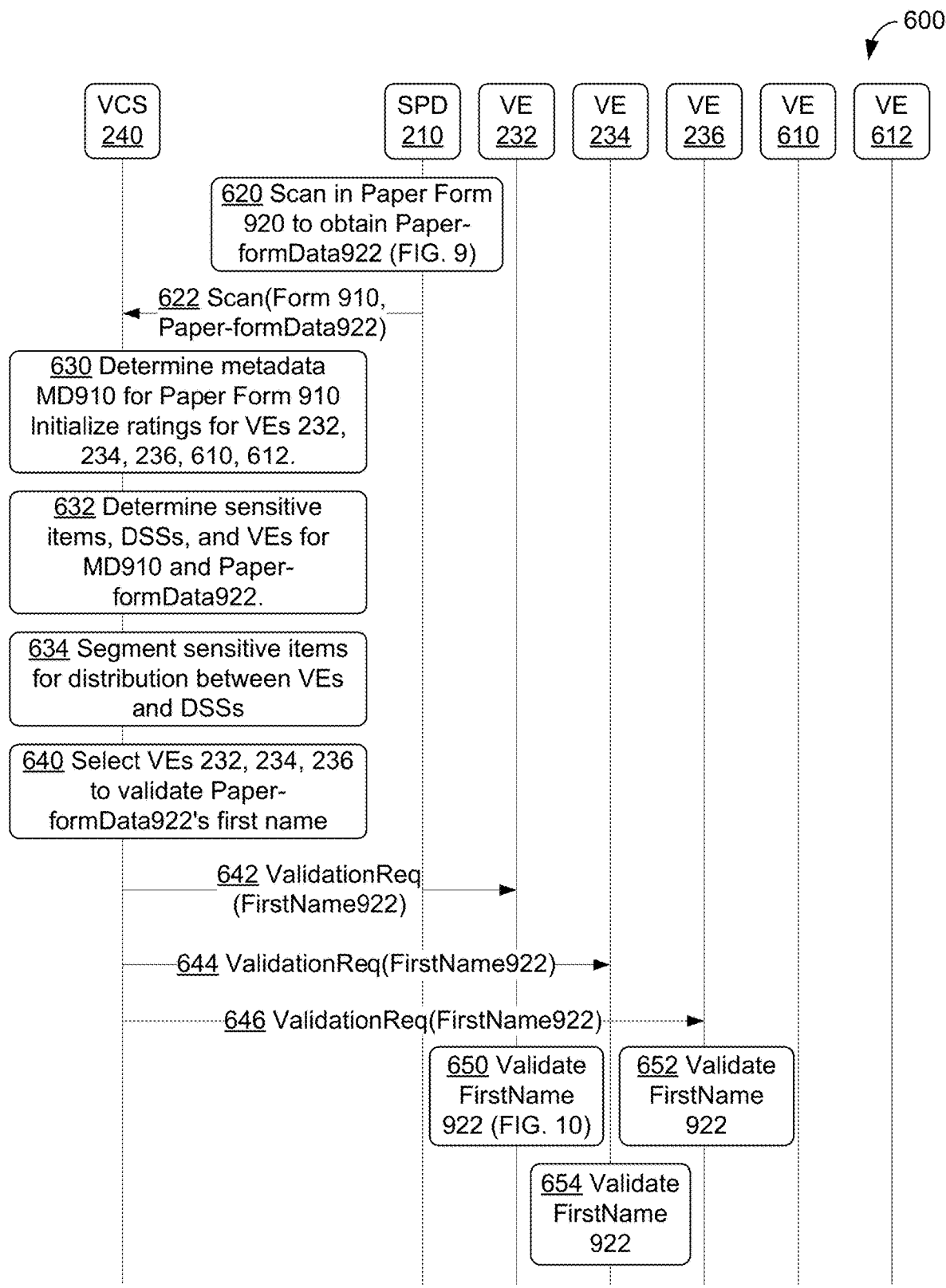
FIGS. 6, 7, and 8 illustrate communications for a scenario for scanning a paper form, validating paper-form data from the paper form, and storing the paper-form data in a plurality of distributed storage systems, in accordance with at least some example embodiments.
Figure 7:
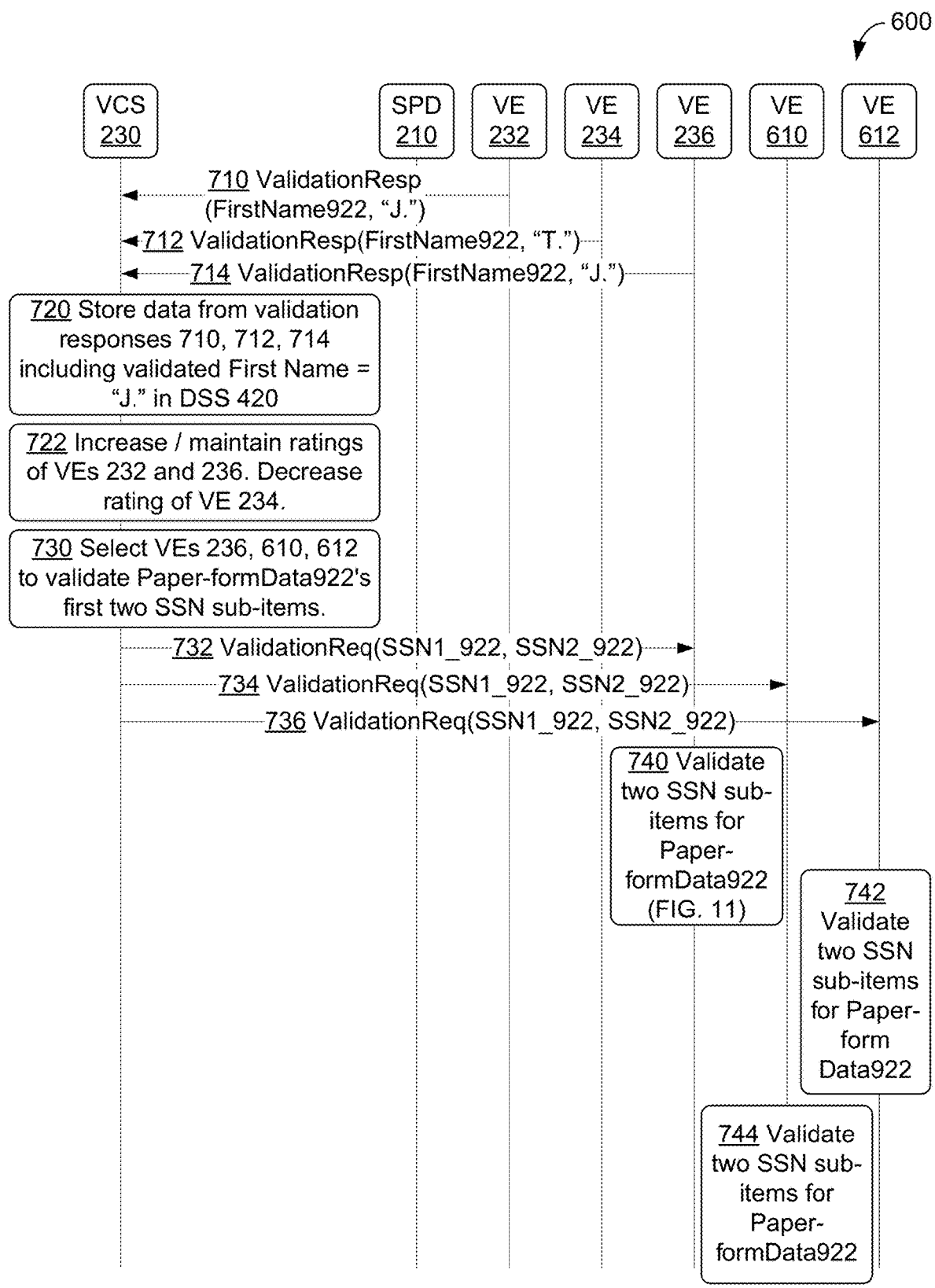
Figure 8:
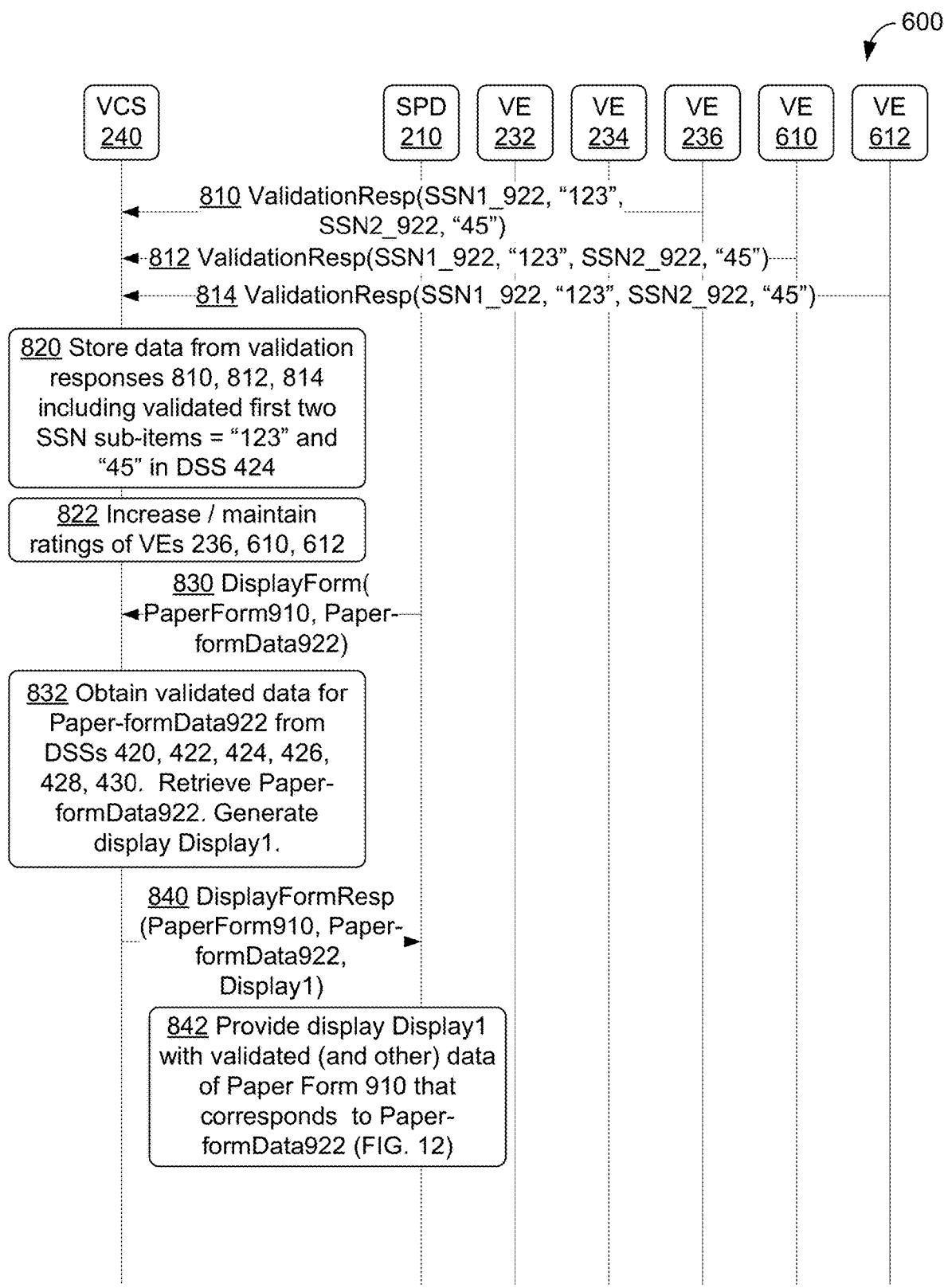

FIGS. 6, 7, and 8 illustrate communications for scenario 600 involving scanning filled-in paper form 920, validating paper-form data 922 from filled-in paper form 920, and storing paper-form data 922 in a plurality of distributed storage systems, in accordance with at least some example embodiments. Scenario 600 begins with scanning/printing device 210 being used to scan in and perform optical character recognition on filled-in paper form 920 to obtain paper-form data 922. Scanning/printing device 210 then sends paper-form data 922, which is associated with paper form 910, to validation coordination server 240. Upon reception of paper-form data 922, validation coordination server 240 begins executing method 300 to validate paper-form data 922. Validation coordination server 240 determines metadata for paper form 910 and initializes ratings for validation entities 232, 234, 236, 610, 612. Validation coordination server 240 determines sensitive data items, distributed storage systems, and validation entities for paper-form data 922. Validation coordination server 240 segments the sensitive data items, for distribution among validation entities and among distributed storage systems. Validation coordination server 240 selects three validation entities 232, 234, 236 to validate a first name of paper-form data 922 and distributes data about the first name to validation entities 232, 234, 236. Validation entities 232, 234, 236 each validate the data about the first name and determine the correct first name is "J." Validation coordination server 240 stores validation input about the first name received from validation entities 232, 234, 236, and rates the validation entities 232, 234, 236 based on the validated first name of "J.".

Scenario 600 proceeds with validation coordination server 240 selecting three validation entities 236, 610, 612 to validate two sub-items of a social security number (SSN)

of paper-form data 922 and distributes data about the two SSN sub-items to validation entities 236, 610, 612. Validation entities 236, 610, 612 each validate the data about the two SSN sub-items and determine the correct first sub-item as "123" and the correct second sub-item "45" Validation coordination server 240 stores validation input about the two sub-items of the SSN received from validation entities 236, 610, 612 and rates the validation entities 236, 610, 612 based on the two validated SSN sub-items "123" and "45".

Scenario 600 continues with validation coordination server 240 receiving a request from scanning/printing device 210 to generate a display of paper form 910 with validated paper-form data 922. Validation coordination server 240 obtains validated paper-form data 922 at least from distributed storage systems 420, 422, 424, 426, 428, 430 and generates a display Display1 of paper form 910 at least with the obtained, validated paper-form data 922. Validation coordination server 240 provides generated Display1 to scanning/printing device 210 and scenario 600 ends.

FIG. 6 shows that scenario 600 begins at block 620 with scanning/printing device 210 being used to scan in and perform optical character recognition on filled-in paper form 920 to obtain paper-form data 922.

Figure 9:
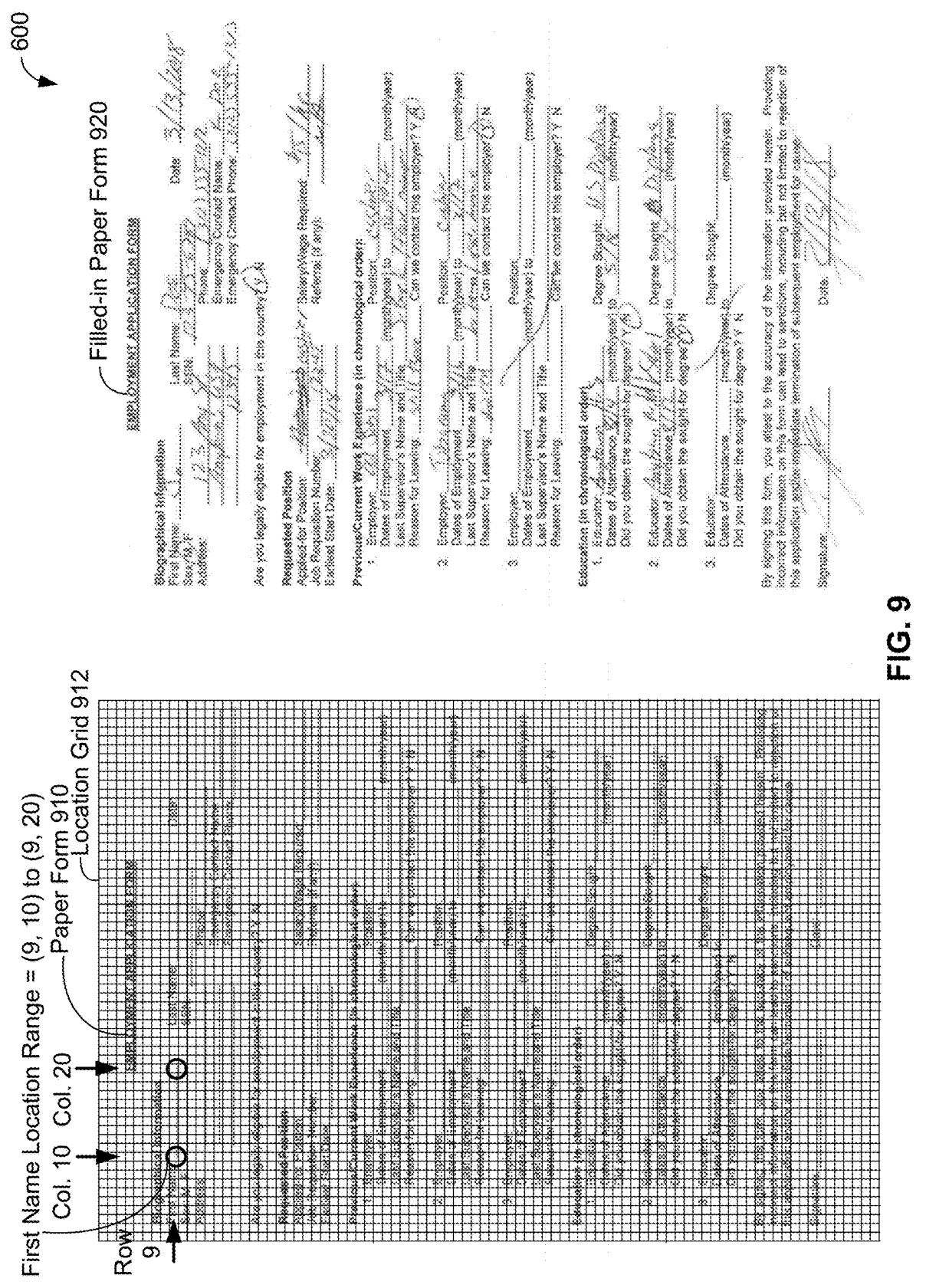

FIG. 9 shows blank paper form 910 overlaid with location grid 912 at left and a corresponding filled-in paper form 920, which is a completed copy of paper form 910, at right, in accordance with at least some example embodiments.

Paper form 910 is an "EMPLOYMENT APPLICATION FORM" with a number of data items organized under headings named "Biographical Information", "Requested Position", "Previous/Current Work Experience", and "Education (in chronological order)" as well as a signature block for a signature and a date. Under the "Biographical Information" heading, paper form 910 has data items labeled "First Name", "Last Name", "Date", "Sex", "SSN", "Address", "Phone", "Emergency Contact Name", and "Emergency Contact Phone", and a data item for a "Y" (Yes) or "N" (No) response to a question about being "legally eligible for employment in this country". Under the "Requested Position" heading, paper form 910 has data items labeled "Applied-for Position", "Salary/Wage Required", "Job Requisition Number", "Referral (if any)", and "Earliest Start Date".

Under the "Previous/Current Work Experience" heading, paper form 910 has three sets of data items, where each set of data items has a data item for "Employer", "Position", "Dates of Employment", "Last Supervisor's Name and Title", "Reason for Leaving", and a data item for a "Y" or "N" response to a question about "contact[ing] this employer". Under the "Education" heading, paper form 910 has three sets of data items, where each set of data items has a data item for "Educator", "Degree Sought", "Dates of Attendance", and a data item for a "Y" or "N" response to a question about "obtain[ing] the sought-for degree".

Location grid 912 is shown overlaying blank paper form 910 for use in locating items on paper form 910. For example, a blank line to provide data for a "First Name" on paper form 910 begins on row 9, column 10 of location grid 912 and ends on row 9, column 20. In scenario 600, locations on location grid 912 are specified as (row, column) pairs, so a first name location range for the blank line to provide "First Name" data can be specified as "(9, 10) to (9, 20)" as shown at upper left of FIG. 9. Other data on paper form 910 can be located using one or more (row, column) pairs of location grid 912 as well. Other techniques for specifying locations related to paper form 910, such as row and column locations specified with respect to paper form 910 (as opposed to locations specified with respect to location grid 912 as shown in FIG. 9) or with locations specified in terms of pixel or other graphical entity locations of a scanned in copy of paper form 910, such as pixel locations of an image of filled-in paper form 920, are possible as well.

Filled-in paper form 920 is a copy of paper form 910 that was completed on a date of "3/13/2018" for a person whose "First Name" is "J." and whose "Last Name" is "DOE" and whose "SSN" is "123-45-6789". Additional data on filled-in paper form 920 can be seen at right of FIG. 9.

FIG. 6 shows that scenario 600 proceeds with scanning/printing device 210 sending scan message 622 to validation coordination server 240 with information about the scan of "Form 910" that includes "Paper-formData922" obtained after scanning/printing device 210 scanned and performed optical character recognition on filled-in paper form 920. Upon reception of scan message 622, validation coordination server 240 uses the procedures of method 300 to validate paper-form data 922 for paper form 910, where scan message 622 is received at block 310 of method 300.

At block 630, validation coordination server 240 uses the procedures of block 320 of method 300 to determine metadata MD910 for data items of paper-form data 922. Metadata for data items is discussed above in more detail in the context of at least FIGS. 3 and 4. Validation coordination server 240 also initializes ratings values for validation entities 232, 234, 236, 610, and 612 used in scenario 600.

At block 632, validation coordination server 240 uses the procedures of block 330 of method 300 to analyze paper-form data 922 and metadata MD910 for the data items of paper-form data 922 for sensitivity, storage, and entity validation at least to determine sensitive data items of paper-form data 922 as including sensitive data. The data items of paper-form data 922 in scenario 600 are the data items discussed above in the context of paper form 910 of FIG. 9. In scenario 600, a sensitive data item is an item of data that can be used as personally identifiable data (such as a name or address) and/or authentication data (such as a signature). Of those data items, validation coordination server 240 determines that the sensitive data items include the "First Name", "Last Name", "SSN", "Address", "Phone", "Emergency Contact Name", "Emergency Contact Phone", and "Signature" items.

Also at block 632 of scenario 600, validation coordination server 240 uses the procedures of blocks 340 and 350 of method 300 to determine distributed storage systems and validation entities for metadata MD910 and paper-form data 922 In scenario 600, validation coordination server 240 determines to use distributed storage systems 420, 422, 424, 426, 428, 430 to store information about metadata MD910 and paper-form data 922 and determines to use validation entities 232, 234, 236, 610, 612 to validate at least part of metadata MD910 and paper-form data 922. In scenario 600, each of distributed storage systems 420, 422, 424, 426, 428, 430 stores a blockchain of blocks of data to store information about metadata MD910 and paper-form data 922, where the blockchain of blocks of data is formatted as indicated by distributed storage system 500 of FIG. 5.

In particular, in scenario 600, only sensitive items of data of paper-form data 922 are validated, while all items of data of paper-form data 922 are stored in one or more distributed storage systems. In particular, distributed storage system 420 stores at least data for the first name item, distributed storage system 422 stores at least data for the last name item, distributed storage system 424 stores at least data for a first two sub-items of the SSN item, distributed storage system 426 stores at least data for a third sub-item of the SSN item, distributed storage system 428 stores at least data for the address item, and distributed storage system 430 stores at least data for the phone item.

In scenario 600, each sensitive item of data is validated by at least three validation entities. First, paper-form data for a sensitive item of data is provided to three validation entities. If the three validation entities have a majority or unanimous opinion on the value(s) provided by the paper-form data for the sensitive item of data, then the majority or unanimous opinion is deemed to be correct and the majority or unanimous opinion value(s) for the sensitive item of data is stored in a distributed storage system as the correct, validated value for the sensitive item of data. However, if all three validation entities have different opinions (and so there is no majority opinion), then validation coordination server 240 selects a second group of three more validation entities to validate the paper-form data for the sensitive item of data and the uses the majority or unanimous opinion of the second group of validation entities as the correct, validated value for the sensitive item of data. If the second group also fails to reach a majority or unanimous opinion, then the paper-form data for the sensitive item of data is deemed to be incorrect/invalid data. Other techniques for validating data can be used in other scenarios.

At block 634, validation coordination server 240 uses the procedures of block 340 of method 300 to segment the sensitive items of data for distribution between validation entities and distributed storage systems.

At block 640, validation coordination server 240 uses the procedures of block 340 of method 300 to select validation entities 232, 234, and 236 to validate the first name item of paper-form data 922.

After selecting validation entities 232, 234, and 236 to validate the first name item, validation coordination server 240 sends validation request messages 642, 644, 646 to respective validation entities 232, 234, 236 to validate the first name item of paper-form data 922. Each of validation request messages 642, 644, 646 includes a portion of paper-form data 922 for the first name item, as shown in FIG. 6 using the "FirstName922" parameters of validation request messages 642, 644, 646. In response to validation request messages 642, 644, 646, respective validation entities 232, 234, 236 validate the first name item of paper-form data 922 as indicated by respective blocks 650, 652, 654 of FIG. 6.

Figure 10:
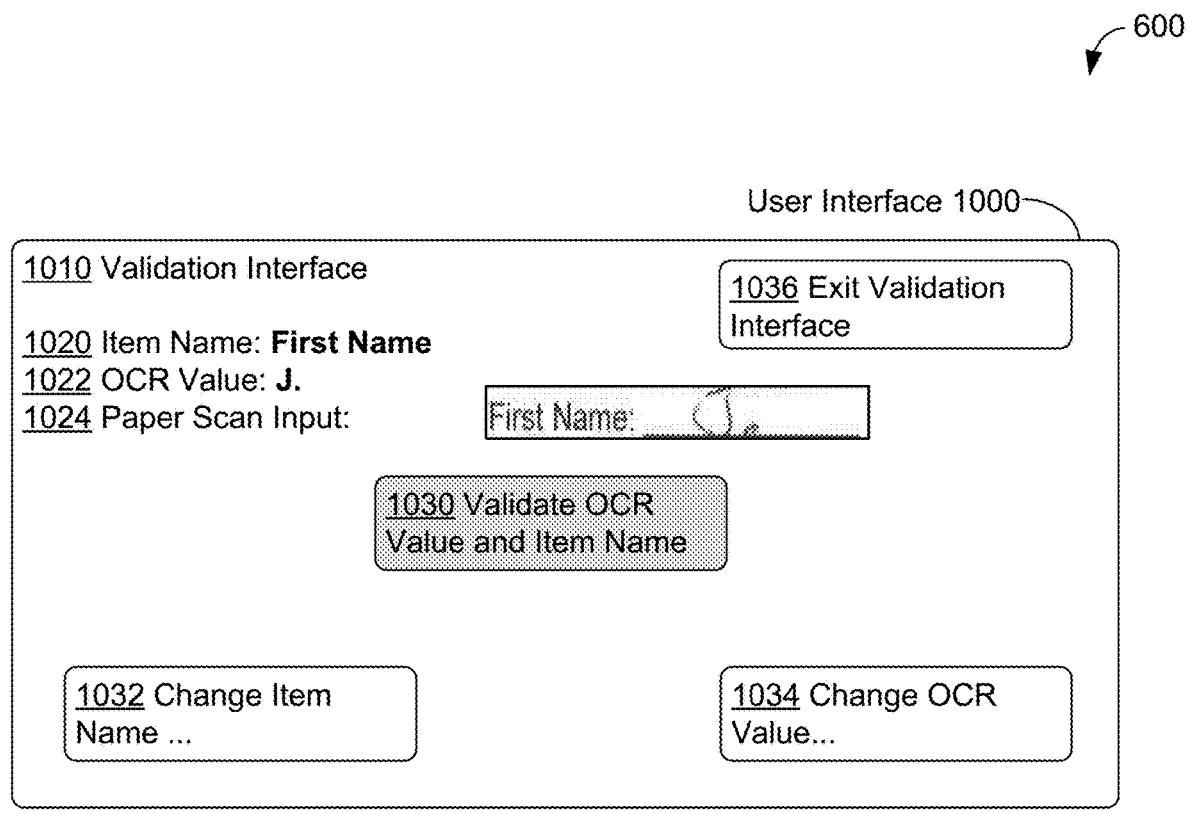
FIG. 10 shows a user interface for validating an item of data, in accordance with at least some example embodiments.

FIG. 10 shows user interface 1000 in use for validating the first name item of paper-form data 922, in accordance with at least some example embodiments. In scenario 600, user interface 1000 is provided by validation coordination server 240 to selected validation entities to validate paper-form data 922. In the specific example shown in FIG. 10, validation coordination server 240 is providing user interface 1000 to validate first name data in paper-form data 922. In particular, user interface 1000 provides validation interface 1010, where validation interface 1010 includes item name 1020, OCR value 1022, paper scan input 1024, validate control 1030, change item name control 1032, change OCR value control 1034, and exit validation interface 1036.

Item name 1020 can display metadata corresponding to a name of a (sensitive) data item of paper-data, such as paper-form data 922. In the example shown in FIG. 10, the item name is "First Name" which is the same item name as shown in paper form 910 and filled-in paper form 920, and so is deemed to be correct in scenario 600.

OCR value 1022 can include paper-form data for one or more sub-items and/or one or more items of data. For example, if a paper document is scanned in and then optical character recognition (or a similar procedure) is applied to the scanned-in paper document, then paper-form data of one or more items of data may be obtained from the paper document. Then, one or more sub-items and/or items of data of the paper-form data can be displayed as OCR value 1022; e.g., to enable a human worker or other entity acting as a validation entity to validate the displayed one or more sub-items and/or items of data.

Paper scan input 1024 can include at least a portion of a paper document used to obtain OCR value 1022. Then, validation of OCR value 1022 can involve comparison of OCR value 1022 with paper scan input 1024. If a human worker or other entity acting as a validation entity views OCR value 1022 and paper scan input 1024 and determines that OCR value 1022 matches or otherwise corresponds to paper scan input 1024, then the validation entity can indicate that OCR value 1022 is correct and valid. Otherwise, if the validation entity viewing OCR value 1022 and paper scan input 1024 determines that OCR value 1022 matches or otherwise corresponds to paper scan input 1024, then the validation entity can indicate that OCR value 1022 is incorrect and invalid. In some examples, when the validation entity indicates that OCR value 1022 is incorrect and invalid, then the validation entity can use user interface 1000 to (attempt to) correct OCR value 1022.

Validate control 1030, change item name control 1032, change OCR value control 1034, and exit validation interface 1036 are controls (buttons) of user interface 1000 that allow a user of user interface 1000 and validation interface 1010 to provide respective indications to: validate a value of a data item of paper-data, change an item name for a data item of paper-data, change a value of a data item of paper-data, and exit validation interface 1010 and/or user interface 1000. In the example shown in FIG. 10, validate control 1030 is shown in grey to indicate selection of validate control 1030. Selection of validate control 1030 indicates that the value "J." shown as OCR value 1022 of the "First Name" data item of paper-data (as indicated by item name 1020) is a correct and valid value for a portion of filled-in paper form 920 that was scanned in and shown as paper scan input 1024. That is, by selecting validate control 1030, a user of validation interface 1010 can indicate to validation coordination server 240 that the first name in paper-form data 922 of "J." is correct.

FIG. 7 shows that scenario 600 continues with each of validation entities 232, 234, 236 providing respective validation responses 710, 712, 714 about the first name item of data in paper-form data 922. Validation responses 710 and 714 indicate that a value of the first name item in paper-form data 922 is "J." and validation response 712 indicates that a value of the first name item in paper-form data 922 is "T."

In scenario 600, a majority response of the validation entities is considered to be correct. Then, validation coordination server 240 can use the procedures of block 370 of method 300 to receive validation responses 710, 712, 714 and determine the correct, validated value of the first name item of paper-form data 922 is "J."

At block 720, validation coordination server 240 can use the procedures of block 380 of method 300 to select distributed storage system 420 to store data about the first name item of paper-form data 922, and stores information in distributed storage system 420 to indicate that the correct, validated value of the first name item of paper-form data 922 is "J."

At block 722, validation coordination server 240 can use the procedures of block 390 of method 300 to rate the validation entities 232, 234, 236 based on the correct, validated value of the first name item of paper-form data 922 as being "J." Since both validation entities 232 and 236 agreed that the value of the first name item of paper-form data 922 was "J.", validation coordination server 240 increases the ratings of both validation entities 232 and 236. However, since validation entity 234 did not share the majority opinion of the value of the first name item of paper-form data 922, validation coordination server 240 decreases the rating of validation entity 234.

In scenario 600, a rating of a validation entity is based on accuracy—that is, a rating of a validation entity is increased (or maintained) if the validation entity agrees with a majority or unanimous opinion about a value of a data item of paper-form data. Alternatively, a rating of a validation entity is decreased (or maintained) if the validation entity disagrees with a majority opinion about the value of the data item of paper-form data. In scenario 600, validation coordination server 240 increases or decreases ratings by one ratings point at a time—if a rating is at or above a threshold ratings value MAXRATE and that rating is supposed to be increased, then validation coordination server 240 does not increase the rating value but maintains the rating at the MAXRATE value. Also, if a rating is at or below a threshold ratings value MINRATE and that rating is supposed to be decreased, then validation coordination server 240 does not decrease the rating value but maintains the rating at the MINRATE value.

In scenario 600, a rating value of a validation entity is initialized to a STARTRATE value of 100 and can be increased up to a MAXRATE value of 200, or decreased down to a MINRATE value of 0. At or before a validation entity VE_LOW reaches a rating at the MINRATE value, though, the validation coordination server 240 can restrict, suspend, and/or terminate access of validation entity VE_LOW to data, including access to distributed storage systems, as discussed above in the context of at least block 390 of method 300. In scenario 600, access to data is restricted if a validation entity has a rating at or below a RED_ACCESS_RATE of 60 and access to data is terminated if the validation entity has a rating at the MINRATE value. In other scenarios, other values of MINRATE, RED_ACCESS_RATE, STARTRATE, and/or MAXRATE can be used and/or other rating and/or access control techniques can be used as well.

FIG. 7 shows that scenario 600 proceeds at block 730, where validation coordination server 240 uses the procedures of block 340 of method 300 to select validation entities 236, 610, 612 to validate two sub-items of an SSN item of paper-form data 922.

After selecting validation entities 236, 610, 612 to validate two sub-items of the SSN item, validation coordination server 240 sends validation request messages 732, 734, 736 to respective validation entities 236, 610, 612 to validate the two sub-items of the SSN item of paper-form data 922. Each of validation request messages 732, 734, 736 includes two portions of paper-form data 922—one portion for a first sub-item of the SSN item as shown in FIG. 7 using the "SSN1_922" parameters of .validation request messages 732, 734, 736 and another portion for a second sub-item of the SSN item as shown using the "SSN2_922" parameters of validation request messages 732, 734, 736 In response to validation request messages 732, 734, 736 respective validation entities 236, 610, 612 validate the first two sub-items of the SSN item of paper-form data 922 as indicated by respective blocks 740, 742, 744 of FIG. 7.

Figure 11:
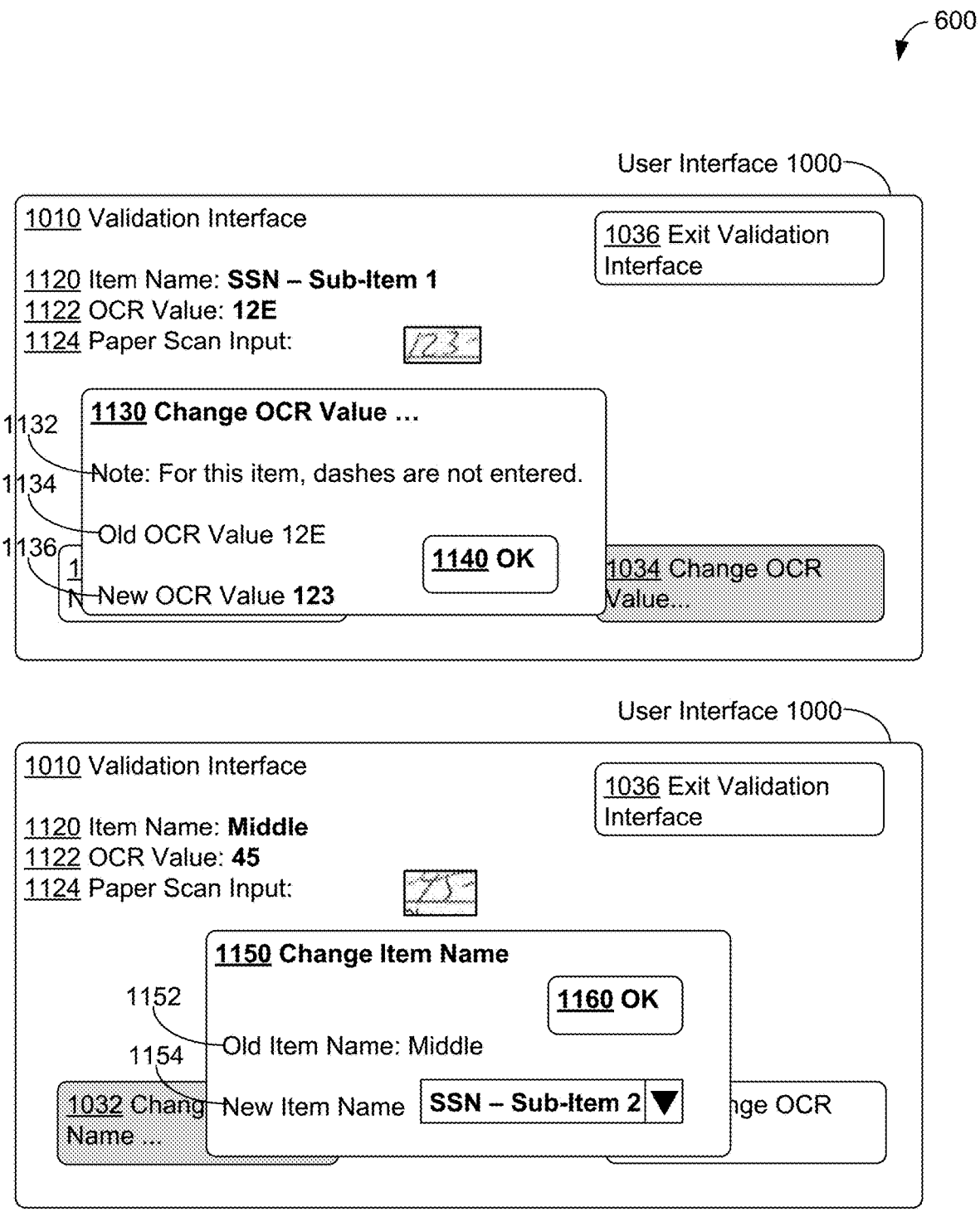
FIG. 11 shows the user interface of FIG. 10 in use for validating sub-items of data, in accordance with at least some example embodiments.

FIG. 11 shows user interface 1000 in use for validating sub-items of paper-form data 922, in accordance with at least some example embodiments. At an upper portion of FIG. 11, user interface 1000 is being used to validate first sub-item of the SSN item in paper-form data 922.

In particular, user interface 1000 provides validation interface 1010, where validation interface 1010 includes item name 1120, OCR value 1122, paper scan input 1124, validate control 1030, change item name control 1032, change OCR value control 1034, and exit validation interface 1036.

Item name 1120 can display metadata corresponding to a name of the first sub-item of the SSN item in paper-form data 922. In the example shown in FIG. 11, the name of the first sub-item is "SSN—Sub-item 1", which is deemed to be correct in scenario 600. OCR value 1122 can include data from paper-form data 922 for the first sub-item of the SSN item. In particular, OCR value 1122 displays a value of "12E" for the first sub-item of the SSN item in paper-form data 922. Paper scan input 1124 can include at least a portion of a paper document used to obtain OCR value 1122. Then, validation of OCR value 1122 can involve comparison of OCR value 1122 with paper scan input 1124; e.g., comparison by a human worker or other entity acting as a validation entity. Validate control 1030, change item name control 1032, change OCR value control 1034, and exit validation interface 1036 are controls of user interface 1000 that are discussed above in more detail in the context of FIG. 10.

In the example shown in the upper portion of FIG. 11, OCR value 1122 displays a value of "12E", and the validation entity viewing paper scan input 1124 as presented by validation interface 1010 does not believe OCR value 1122 is correct. Therefore, as indicated by a grey color of change OCR value control 1034, the validation entity has selected change OCR value control 1034 to modify the paper-form data for the first sub-item of the SSN item in paper-form data 922.

In response to selection of change OCR value control 1034, validation interface 1010 presents change OCR value dialog 1130. As shown in the upper portion of FIG. 11, change OCR value dialog 1130 displays note 1132 that "[f]or this item, dashes are not entered" and enables the validation entity to change old OCR value 1134 having a value of "12E" to new OCR value 1136 (that is, a new value of the first sub-item of the SSN item in paper-form data 922) having a value of "123". Along with a control for providing the "New OCR Value", change OCR value dialog 1130 also includes OK control 1140 that can be selected by the validation entity to indicate that the validation entity has changed the value of the first sub-item of the SSN item in paper-form data 922 to a correct value in the validation entity's opinion. Upon selection of OK control 1140, validation interface 1010 can accept the changed value of the first sub-item of the SSN item in paper-form data 922 and, in some cases, generate a response message to provide the changed value to validation coordination server 240.

At a lower portion of FIG. 11, user interface 1000 is shown being used to validate the second sub-item of the SSN item in paper-form data 922. In particular, user interface 1000 provides validation interface 1010, where validation interface 1010 includes item name 1120, OCR value 1122, paper scan input 1124, validate control 1030, change item name control 1032, change OCR value control 1034, and exit validation interface 1036, all of which are discussed above in the context of FIG. 10 and/or the upper portion of FIG. 11.

More specifically, item name 1120 can display metadata corresponding to a name of the second sub-item of the SSN item in paper-form data 922. In the example shown in FIG.

11, the name of the second sub-item is "Middle". OCR value 1122 can include paper-form data for the second sub-item of the SSN item—the lower portion of FIG. 11 shows a value of "45" for the second sub-item of the SSN item in paper-form data 922. Paper scan input 1124 can include at least a portion of a paper document used to obtain OCR value 1122.

In the example shown in the upper portion of FIG. 11, OCR value 1122 displays a value of "45", and the validation entity viewing paper scan input 1124 as presented by validation interface 1010 believes OCR value 1122 is correct. However, the validation entity viewing item name 1120 does not believe an item name of "Middle" is correct for a name of the second sub-item of the SSN item. Therefore, as indicated by a grey color of change item name control 1032, the validation entity has selected change item name control 1032 to modify metadata related to the item name for the second sub-item of the SSN item in paper-form data 922.

In response to selection of change item name control 1032, validation interface 1010 presents change item name dialog 1150. As shown in the lower portion of FIG. 11, change item name dialog 1150 enables the validation entity to change old item name 1152 having a value of "Middle" to new item name 1154 (that is, a new value of metadata related to the item name for the second sub-item of the SSN item in paper-form data 922) having a value of "SSN—Sub-item 2". Along with a control for providing the "New Item Name", change item name dialog 11500 also includes OK control 1160 that can be selected by the validation entity to indicate that the validation entity has changed the value of metadata related to the item name for the second sub-item of the SSN item in paper-form data 922 to a correct value in the validation entity's opinion. Upon selection of OK control 1160, validation interface 1010 can accept the changed value of the metadata related to the item name for the second sub-item of the SSN item in paper-form data 922) and, in some cases, generate a response message to provide the changed value to validation coordination server 240.

In scenario 600, each of validation entities 236, 610, 612 validate the data about the two SSN sub-items and determine the correct first sub-item as "123", the correct second sub-item as "45", and the correct item name for the second sub-item of the SSN item as "SSN—Sub-item 2"; that is, all three validation entities 236, 610, 612 entities agree on both data for both SSN sub-items and the corresponding metadata.

Turning to FIG. 8, scenario 600 continues with each of validation entities 236, 610, 612 providing respective validation responses 810, 812, 814 about the first two sub-items of the SSN item in paper-form data 922. All three validation responses 810, 812, 814 indicate that a value of the first sub-item of the SSN item in paper-form data 922 is "123" and that a value of the second sub-item of the SSN item in paper-form data 922 is "45". In other scenarios that scenario 600, one or more of validation responses 810, 812, 814 also indicate the changed metadata/item name of the second sub-item of the SSN item in paper-form data 922 of "SSN—Sub-item 2" as mentioned above in the context of the lower portion of FIG. 11.

At block 820, validation coordination server 240 can use the procedures of block 370 of method 300 to receive validation responses 810, 812, 814 and determine the correct, validated values of the first two sub-items of the SSN item of paper-form data 922 are "123" and "45". Also, validation coordination server 240 can use the procedures of block 380 of method 300 to select distributed storage system 424 for storing validation input about the first two sub-items of the SSN item received from validation entities 236, 610, 612; e.g., the "123" correct, validated value of the first sub-item and the "45" correct, validated value of the second sub-item, and then to store the validation input about the first two sub-items of the SSN item using distributed storage system 424.

At block 822, validation coordination server 240 can use the procedures of block 390 of method 300 to rate validation entities 236, 610, 612 based on the two validated SSN sub-items "123" and "45". As all three validation entities 236, 610, 612 agreed on the values of the first and second sub-items of the SSN item of paper-form data 922, validation coordination server 240 increases the ratings of each of validation entities 236, 610, 612 by two ratings points—one ratings point for each correctly validated sub-item.

Scenario 600 continues with validation coordination server 240 receiving DisplayForm request message 830 from scanning/printing device 210 to request a display of "PaperForm910" using "Paper-formData922".

At block 832, in response to DisplayForm request message 830, validation coordination server 240 can obtain validated and other (e.g., non-validated and/or invalid) data for paper-form data 922 at least from distributed storage systems 420, 422, 424, 426, 428, 430. Then, validation coordination server 240 can generate a display Display1 of paper form 910 as if paper form 910 had been filled in with paper-form data 922.

After generating Display1, validation coordination server 240 can send DisplayFormResp response message 840 to scanning/printing device 210 in response to DisplayForm request message 830. As shown in FIG. 8, DisplayFormResp response message 840 provides "Display1" as a display of "PaperForm910" using "Paper-formData922".

At block 842, scanning/printing device 210 can provide display Display1 using user interface 1200.

FIG. 12 shows user interface 1200 for providing paper form display 1210, in accordance with at least some example embodiments. In scenario 600, paper form display 1210 is an example of Display1. Paper form display 1210 (and Display1) includes both validated portions of paper-form data 922 and portions of paper-form data 922 that have not been validated. In scenario 600, portions of paper-form data 922 that have not been validated include portions of paper-form data 922 that were not validated since they were not sensitive data items and portions of paper-form data 922 that have been validated but found to be invalid; i.e., validation entities did not agree on values of the invalid portions of paper-form data 922.

Paper form display 1210 includes a display of paper form 910 with data from paper-form data 922 and controls 1212, 1214, 1216, 1218. More specifically, FIG. 12 shows that paper form display 1210 includes a portion of paper form 910 that includes the headings named "Biographical Information", "Requested Position", "Previous/Current Work Experience" and corresponding portions of paper-form data 922 that was originally scanned in from filled-in paper form 920 and has been partially validated during scenario 600.

In scenario 600, the locations of data items and related paper-form data on paper form display 1210 are based on the locations of data items and related filled-in data as provided on filled-in paper form 920. For example, as mentioned above, location grid 912 can be used to determine locations of data items and related filled-in data on filled-in paper form 920. Then, these locations of data items and related filled-in data on filled-in paper form 920 can be utilized in designing, generating, and/or presenting paper form display 1210—for example, if location grid 912 is a grid of NR1 rows by NC1 columns, then paper form display 1210 can be designed as a grid of NR1 rows by NC1 columns. Then, locations on filled-in paper form 920 specified in terms of location grid 912 can be used (perhaps after scaling or other translation) on the NR1 row by NC1 column grid of paper form display 1210. Other techniques for determining locations of data items and related paper-form data on displays based on locations of data items and related paper-form data on paper forms are possible as well.

Paper form display 1210 shows paper-form data in a different font than a font used for words on blank paper form 910 to illustrate that the paper-form data differs from words used on the form. Also, paper form display 1210 uses bold fonts to show selections that may have been circled or otherwise selected in filled-in paper form 920; e.g., at center-right of FIG. 12, respective data indicators 1236 and 1238 shows respective bold values of "N" and "Y" to indicate selections of respective N and Y values via circling on filled-in paper form 920. Further, data items that were not provided in paper-form data (e.g., data items not filled in on filled-in paper form 920), as shown in as blank link data indicators in paper form display 1210 as blank lines, such as a blank line shown for data indicator 1240.

User interface 1200 allows for selection of an item of data to show a corresponding portion of filled-in paper form 920. For example, if a user selected the "First Name" item and/or corresponding paper-form data in paper form display 1210 (including a validation indicator displayed with the paper-form data), then user interface 1200 can provide a display of a corresponding portion of filled-in paper form 920 to show an excerpt of filled-in paper form 920 showing the "First Name" item and the corresponding written "J.", similar to the excerpt of filled-in paper form 920 provided as paper scan input 1024 and shown in FIG. 10.

In the portion of paper form 910 that includes the heading named "Biographical Information" shown in an upper portion of FIG. 12, the "Last Name" item has data indicator 1230 shown as "Doe" and validation indicator 1220 shown as "<V>". Data indicator 1230 shows data "Doe" of paper-form data 922 (after retrieval from a distributed storage system, such as distributed storage system 422) where "Doe" is the last name provided on filled-in paper form 920. Validation indicator 1220 of "<V>" indicates that the last name of "Doe" has been validated by one or more validation entities and found to be correct.

Also the "First Name" item is shown as "J.<V>", where "J." is the first name provided on filled-in paper form 920 and retrieved from a distributed storage system (such as distributed storage system 420) as part of paper-form data 922, and where the "<V>" is a validation indicator indicated that the first name of "J." has been validated and found to be correct in paper-form data 922. Similar validated examples of data indicators are shown under the heading named "Biographical Information" in the "SSN", "Phone", and the "Emergency Contact Name" data items.

The "Contact Phone" item shown in paper form display 1210 includes data indicator 1232 of "(312) 555-1313" and validation indicator 1222 of "<IV>", where an "<IV>" validation indicator indicates that validation of the data of data indicator 1232 was attempted, but the data was found to be invalid. Other validation indicators than the "<V>" indication of validated data and the "<IV>" indication of invalid data are possible as well; e.g., an "<IP>" indication of data validation in progress, an "<NV>" indication of not validated data, an "<IN>" indication of data that is ineligible for validation. Paper form display 1210 does not show a validation indicator for data items where no validation was attempted; e.g., because the data item is not a sensitive data item. For example, data indicator 1234 shows paper-form data of "$15/hour" without a validation indicator as the corresponding "Salary/Wage Required" data item was not validated.

Also, other techniques for indicating a validation status of data other than validation indicator 1220 and/or validation indicator 1222 are possible as well; e.g., a separate display of validation status, a color-based display of validation status (a green indication=validated data, a red indication=invalid data, etc.).

Exit control 1212, when selected, terminates (or exits) the display of paper form 910. In some examples, when exit control 1212 is selected, then user interface 1200 is also closed (and/or is terminated). More data control 1214, when selected, provides additional data from paper form 910 and paper-form data 922; e.g., a portion of paper form 910 that is not currently being displayed in paper form display 1210. Side-by-side control 1216, when selected, toggles paper form display between: (i) a display of paper form 910 with data from paper-form data 922 as shown in FIG. 12 and (ii) a display of both paper form 910 with data from paper-form data 922 and a scanned-in copy of filled-in paper form 920, where the display of paper form 910 and the display of the scanned-in copy are shown in one display (e.g., side-by-side, above and below) within user interface 1200. New form control 1218, when selected, allows a user of user interface 1200 to select a new form and/or new paper-form data for display using user interface 1200.

Scenario 600 ends after scanning/printing device 210 provides Display1; e.g., by visually presenting Display1 on a screen or other visual output device. In other scenarios, another device, such as computing device 100 perhaps acting as a node, can generate and/or provide Display1 in response to an input to provide such as display; e.g., an input such as DisplayForm request message 830.

IV. Example Methods of Operation

FIG. 13 is a flowchart of method 1300, in accordance with at least some example embodiments. Method 1300 can be carried out by a computing device acting as a node, such as computing device 100, computing device 220, distributed storage system server 230, validation coordination server 240, and/or a printing device; e.g., scanning/printing device 210, 212, 214, 216.

Method 1300 can begin at block 1310, where the node can receive paper-form data obtained from a paper form, where the paper form includes a plurality of data items, such as discussed herein in the context of at least FIGS. 3, 4, 6, and 9. In some examples, the node can include one or more scanning components; then, receiving the paper-form data can include obtaining the paper-form data using the one or more scanning components, such as discussed herein in the context of at least FIGS. 3 and 6.

At block 1320, for at least a first data item and a second data item of the plurality of data items, the node can: determine first item metadata for the first data item and second item metadata for the second data item, determine a first validation entity to validate a value of the first data item based on the first item metadata, determine a second validation entity to validate a value of the second data item based on the second item metadata, where the second validation entity differs from the first validation entity, provide a first user interface including a display of the first data item, receive, from the first validation entity, a first input for a first validation status of the value of the first data item by way of the first user interface, select a first distributed storage system of a plurality of distributed storage systems, where the first distributed storage system is associated with the first data item, and record the value of the first data item and the first validation status of the value of the first data item in the first distributed storage system; such as discussed herein in the context of at least FIGS. 3-11.

In some examples, the first validation entity and the second validation entity can be among a plurality of validation entities; then, determining the first validation entity to validate the value of the first data item can include selecting the first validation entity from among the plurality of validation entities based on the first item metadata, such as discussed herein in the context of at least FIGS. 3 and 6-8. In some of these examples, the plurality of validation entities can further include a third validation entity; then, recording the value of the first data item and the first validation status of the value of the first data item in the first distributed storage system can include: receiving a first value of the first data item and the first validation status of the value of the first data item from the first validation entity; receiving a second value of the first data item and a second validation status of the value of the first data item from the third validation entity; and determining a rating of the first validation entity and/or a rating of the third validation entity based on the first value and the second value, such as discussed herein in the context of at least FIGS. 3 and 6-8. In other of these examples, determining the rating of the first validation entity and/or the rating of the third validation entity based on the first value and the second value can include: determining whether the first value and the second value are the same; and after determining that the first value and the second value are the same, increasing the rating of the first validation entity and/or the rating of the third validation entity, such as discussed herein in the context of at least FIGS. 3 and 6-8. In even other of these examples, determining the rating of the first validation entity and/or the rating of the third validation entity based on the first value and the second value can include: determining whether the first value and the second value are not the same; and after determining that the first value and the second value are not the same, decreasing the rating of the first validation entity and/or the rating of the third validation entity, such as discussed herein in the context of at least FIGS. 3 and 6-8. In still other of these examples, the rating of the first validation entity and/or the rating of the third validation entity can include decreasing the rating of the first validation entity; then, method 1300 can further include: after decreasing the rating of the first validation entity, determining whether the rating of the first validation entity is less than a threshold rating; and after determining that the rating of the first validation entity is less than the threshold rating, restricting access of the first validation entity to at least one distributed storage system of the plurality of distributed storage systems, such as discussed herein in the context of at least FIGS. 3 and 6-8.

In other examples, the first data item can include a first sub-item and a second sub-item; then, determining the first validation entity to validate the value of the first data item based on the first item metadata can include: determining a fourth validation entity to validate a value of the first sub-item; and determining a fifth validation entity to validate a value of the second sub-item, such as discussed herein in the context of at least FIGS. 6-8 and 11.

In still other examples, the first item metadata can include one or more of: data about the validation status of the value of the first data item, data about a name of the first data item, a validation time of the first data item, data about a validation entity associated with the first data item, and data about a distributed storage system configured to store the value of the first data item, such as discussed herein in the context of at least FIGS. 3 and 4. In even other examples, the first item metadata can include a location of the first data item on the paper form, such as discussed herein in the context of at least FIGS. 3, 4, 9, and 12. In yet other examples, providing the first user interface can include providing a user interface including a display of both the first data item and at least a portion of the paper form associated with the first data item, such as discussed herein in the context of at least FIGS. 6-8 and 10-12.

At block 1330, the node can generate an output that is related to the paper-form data based on the first distributed storage system, such as discussed herein in the context of at least FIGS. 3, 8, and 12. In some examples, the output of the node related to the paper-form data can include a display of the paper-form data and/or a display of the paper form, such as discussed herein in the context of at least FIGS. 3, 8, 9, and 12. In some of these examples, the paper form can include a third item at a first location within the paper form, the display of the paper-form data can include a display of a fourth item that includes data from the third item, and the fourth item can be displayed within the display of the paper-form data at a second location that is based on the first location, such as discussed herein in the context of at least FIGS. 3, 8, 9, and 12.

In some examples, method 1300 can further include: providing a second user interface that includes a display of the second data item using the node; receiving, at the node from the second validation entity, a second input for a second validation status of the value of the second data item by way of the second user interface; selecting a second distributed storage system of the plurality of distributed storage systems using the node, where the second distributed storage system is associated with the second data item; and recording the value of the second data item and the second validation status of the value of the second data item in the second distributed storage system using the node; then, generating the output of the node related to the paper-form data can include generating an output of the node related to the paper-form data based on the first distributed storage system and the second distributed storage system, such as discussed herein in the context of at least FIGS. 3-11.

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A system, comprising:
   a node that
      receives paper-form data scanned from a paper form having a plurality of data items including a first data item and a second data item,
      selects a first distributed storage system of a plurality of distributed storage systems, wherein the first distributed storage system is associated with the first data item,
      determines first item metadata for the first data item and second item metadata for the second data item,
      provides a first user interface comprising a display of the first data item, and
      generates an output related to the paper-form data based on the first distributed storage system;
   a first validation entity to validate a value of the first data item based on the first item metadata by providing to the first user interface a first input for a first validation status of the value of the first data item; and
   a second validation entity to validate a value of the second data item based on the second item metadata, wherein the second validation entity differs from the first validation entity, and wherein the first and second validation entities are determined by the node;
   wherein the node records the value of the first data item and the first validation status of the value of the first data item in the first distributed storage system.

2. The system of claim 1, wherein the output of the node related to the paper-form data comprises a display of the paper-form data and/or a display of the paper form.

3. The system of claim 2, wherein the paper form comprises a third item at a first location within the paper form, wherein the display of the paper-form data comprises a display of a fourth item that comprises data from the third item, and wherein the fourth item is displayed within the display of the paper-form data at a second location that is based on the first location.

4. The system of claim 1, wherein the node comprises one or more scanning components, and wherein the node receiving the paper-form data comprises obtaining the paper-form data using the one or more scanning components.

5. The system of claim 1, wherein the first validation entity and the second validation entity are among a plurality of validation entities, and wherein the node determining the first validation entity to validate the value of the first data item comprises the node selecting the first validation entity from among the plurality of validation entities based on the first item metadata.

6. The system of claim 5, wherein the plurality of validation entities further comprises a third validation entity, and wherein the node recording the value of the first data item and the first validation status of the value of the first data item in the first distributed storage system comprises:
   the node receiving a first value of the first data item and the first validation status of the value of the first data item from the first validation entity;
   the node receiving a second value of the first data item and a second validation status of the value of the first data item from the third validation entity; and
   the node determining a rating of the first validation entity and/or a rating of the third validation entity based on the first value and the second value.

7. The system of claim 6, wherein the node determining the rating of the first validation entity and/or the rating of the third validation entity based on the first value and the second value comprises:
   the node determining whether the first value and the second value are the same; and
   after determining that the first value and the second value are the same, the node increasing the rating of the first validation entity and/or the rating of the third validation entity.

8. The system of claim 6, wherein the node determining the rating of the first validation entity and/or the rating of the third validation entity based on the first value and the second value comprises:
   the node determining whether the first value and the second value are not the same; and
   after determining that the first value and the second value are not the same, the node decreasing the rating of the first validation entity and/or the rating of the third validation entity.

9. The system of claim 8, wherein the node decreasing the rating of the first validation entity and/or the rating of the third validation entity comprises the node decreasing the rating of the first validation entity, determining whether the rating of the first validation entity is less than a threshold rating, and after determining that the rating of the first validation entity is less than the threshold rating, the node restricting access of the first validation entity to at least one distributed storage system of the plurality of distributed storage systems.

10. The system of claim 1, wherein the first data item comprises a first sub-item and a second sub-item, and wherein the node determining the first validation entity to validate the value of the first data item based on the first item metadata comprises:
   the node determining a fourth validation entity to validate a value of the first sub-item; and the node determining a fifth validation entity to validate a value of the second sub-item.

11. The system of claim 1, wherein the first item metadata comprises one or more of: data about a validation status of the value of the first data item, data about a name of the first data item, a validation time of the first data item, data about a validation entity associated with the first data item, and data about a distributed storage system configured to store the value of the first data item.

12. The system of claim 1, wherein the first item metadata comprises a location of the first data item on the paper form.

13. The system of claim 1, wherein providing the first user interface comprises providing a user interface comprising a display of both the first data item and at least a portion of the paper form associated with the first data item.

14. The system of claim 1,:
wherein the node further provides to the second validation entity a second user interface comprising a display of the second data item, selects a second distributed storage system of the plurality of distributed storage systems, wherein the second distributed storage system is associated with the second data item, and records the value of the second data item and a second validation status of the value of the second data item in the second distributed storage system;

wherein the second validation entity validates the value of the second data item based on the second item metadata by providing to the second user interface a second input for the second validation status of the value of the second data item; and wherein the node generating the output of the node related to the paper-form data comprises generating an output of the node related to the paper-form data based on the first distributed storage system and the second distributed storage system.

* * * * *